United States Patent
Takayanagi

(10) Patent No.: US 12,025,332 B2
(45) Date of Patent: *Jul. 2, 2024

(54) INFORMATION PROCESSING METHOD, RECORDING MEDIUM, AND INFORMATION PROCESSING SYSTEM

(71) Applicant: Panasonic Intellectual Property Management Co., Ltd., Osaka (JP)

(72) Inventor: Tetsuya Takayanagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,647

(22) Filed: Jul. 14, 2022

(65) Prior Publication Data

US 2022/0364758 A1 Nov. 17, 2022

Related U.S. Application Data

(63) Continuation of application No. 17/005,263, filed on Aug. 27, 2020, now Pat. No. 11,421,905, which is a
(Continued)

(30) Foreign Application Priority Data

Jun. 14, 2018 (JP) .................................. 2018-113436
Jun. 14, 2018 (JP) .................................. 2018-113437

(51) Int. Cl.
*F24F 11/63* (2018.01)
*F24F 11/74* (2018.01)
(Continued)

(52) U.S. Cl.
CPC .............. *F24F 11/63* (2018.01); *F24F 11/74* (2018.01); *F24F 11/79* (2018.01); *G05B 19/042* (2013.01);
(Continued)

(58) Field of Classification Search
CPC .. F24F 11/63; F24F 11/74; G06T 7/70; G06T 2207/30201; G06K 9/00268; G06K 9/00375
See application file for complete search history.

(56) References Cited

U.S. PATENT DOCUMENTS

2008/0279420 A1 11/2008 Masticola
2009/0312660 A1 12/2009 Guarino
(Continued)

FOREIGN PATENT DOCUMENTS

JP 2016-184590 10/2016
JP 2017/117416 6/2017

OTHER PUBLICATIONS

International Search Report of PCT application No. PCT/JP2019/019999 dated Jul. 16, 2019.
(Continued)

*Primary Examiner* — Mohammad Ali
*Assistant Examiner* — Vincent W Chang
(74) *Attorney, Agent, or Firm* — Wenderoth, Lind & Ponack, L.L.P.

(57) ABSTRACT

Provided is an information processing method executed by a computer. The information processing method includes detecting a cough or a sneeze of a person who is in a predetermined space; acquiring an image of the predetermined space captured when the cough or the sneeze is detected; recognizing a state around a mouth of the person from the image; generating, based on the recognized state around the mouth of the person, a control signal for controlling at least one of a direction or a volume of air that is to be sent from an airflow generation apparatus that generates an airflow in the predetermined space; and outputting the generated control signal.

2 Claims, 25 Drawing Sheets

Related U.S. Application Data continuation of application No. PCT/JP2019/019999, filed on May 21, 2019.

(51) Int. Cl.

| | | |
|---|---|---|
| *F24F 11/79* | (2018.01) | |
| *G05B 19/042* | (2006.01) | |
| *G06T 7/70* | (2017.01) | |
| *G06V 40/10* | (2022.01) | |
| *G06V 40/16* | (2022.01) | |
| *F24F 120/14* | (2018.01) | |

(52) U.S. Cl.
CPC .............. *G06T 7/70* (2017.01); *G06V 40/107* (2022.01); *G06V 40/168* (2022.01); *F24F 2120/14* (2018.01); *G05B 2219/2614* (2013.01); *G06T 2207/30201* (2013.01)

(56) References Cited

U.S. PATENT DOCUMENTS

| | | |
|---|---|---|
| 2012/0150333 A1 | 6/2012 | De Luca |
| 2012/0199003 A1 | 8/2012 | Melikov |
| 2012/0310417 A1 | 12/2012 | Enohara et al. |
| 2013/0130227 A1 | 5/2013 | Peltz et al. |
| 2014/0102442 A1 | 4/2014 | Wilson |
| 2016/0325839 A1 | 11/2016 | Wang |
| 2017/0048492 A1 | 2/2017 | Buford |
| 2017/0106892 A1 | 4/2017 | Lisseman |
| 2018/0206764 A1* | 7/2018 | Ozawa ................. A61B 5/0823 |
| 2019/0128553 A1 | 5/2019 | Hilbig |
| 2022/0415516 A1* | 12/2022 | Kim ....................... G16H 50/30 |

OTHER PUBLICATIONS

Zhiqiang Kang et al., "Numerical Simulation of Coughed Droplets in the Air-Conditioning Room", Procedia Engineering 121, Oct. 7, 2015, pp. 114-121.

C. Chen et al., "Simplified models for exhaled airflow from a cough with the mouth covered", Indoor Air, vol. 24, No. 6, Mar. 14, 2014, pp. 580-591.

* cited by examiner

FIG. 5

| STATE AROUND MOUTH | MOUTH IS NOT COVERED | | MOUTH IS COVERED WITH HAND | MOUTH IS COVERED WITH HANDKERCHIEF OR SLEEVE OF JACKET | MOUTH IS COVERED WITH MASK |
|---|---|---|---|---|---|
| FACE ORIENTATION | FORWARD | DOWNWARD | | ALL DIRECTIONS | |
| CONTROL MODE | CONTROL AIR DIRECTION SO THAT AIR IS SENT TO 1 M IN FRONT OF FACE | CONTROL AIR DIRECTION SO THAT AIR IS SENT DOWNWARD AT 90 DEGREES | CONTROL AIR DIRECTION SO THAT AIR IS SENT TOWARD TARGET | CHANGE OPERATION MODE TO POWERFUL OPERATION MODE | CONTROL AIR DIRECTION SO THAT AIR IS SENT TOWARD TARGET |

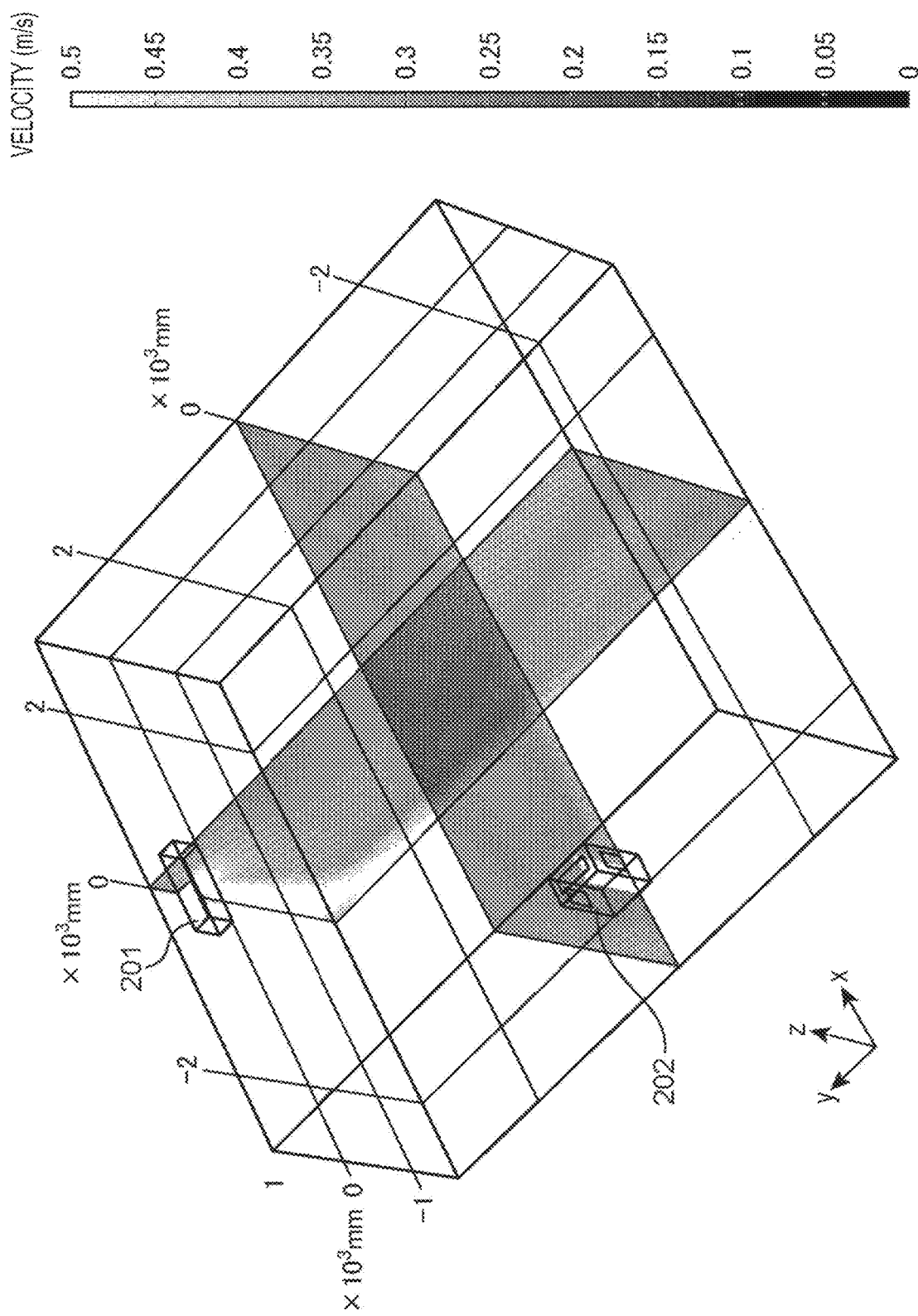

FIG. 8

| STATE AROUND MOUTH | MOUTH IS NOT COVERED | | MOUTH IS COVERED WITH HAND | MOUTH IS COVERED WITH HANDKERCHIEF OR SLEEVE OF JACKET | MOUTH IS COVERED WITH MASK |
|---|---|---|---|---|---|
| FACE ORIENTATION | FORWARD | DOWNWARD | | ALL DIRECTIONS | |
| CONTROL MODE | CONTROL AIR DIRECTION SO THAT AIR IS SENT TO 1 M IN FRONT OF FACE | CHANGE OPERATION MODE TO POWERFUL OPERATION MODE | CONTROL AIR DIRECTION SO THAT AIR IS SENT TOWARD TARGET | CHANGE OPERATION MODE TO POWERFUL OPERATION MODE | CONTROL AIR DIRECTION SO THAT AIR IS SENT TOWARD TARGET |

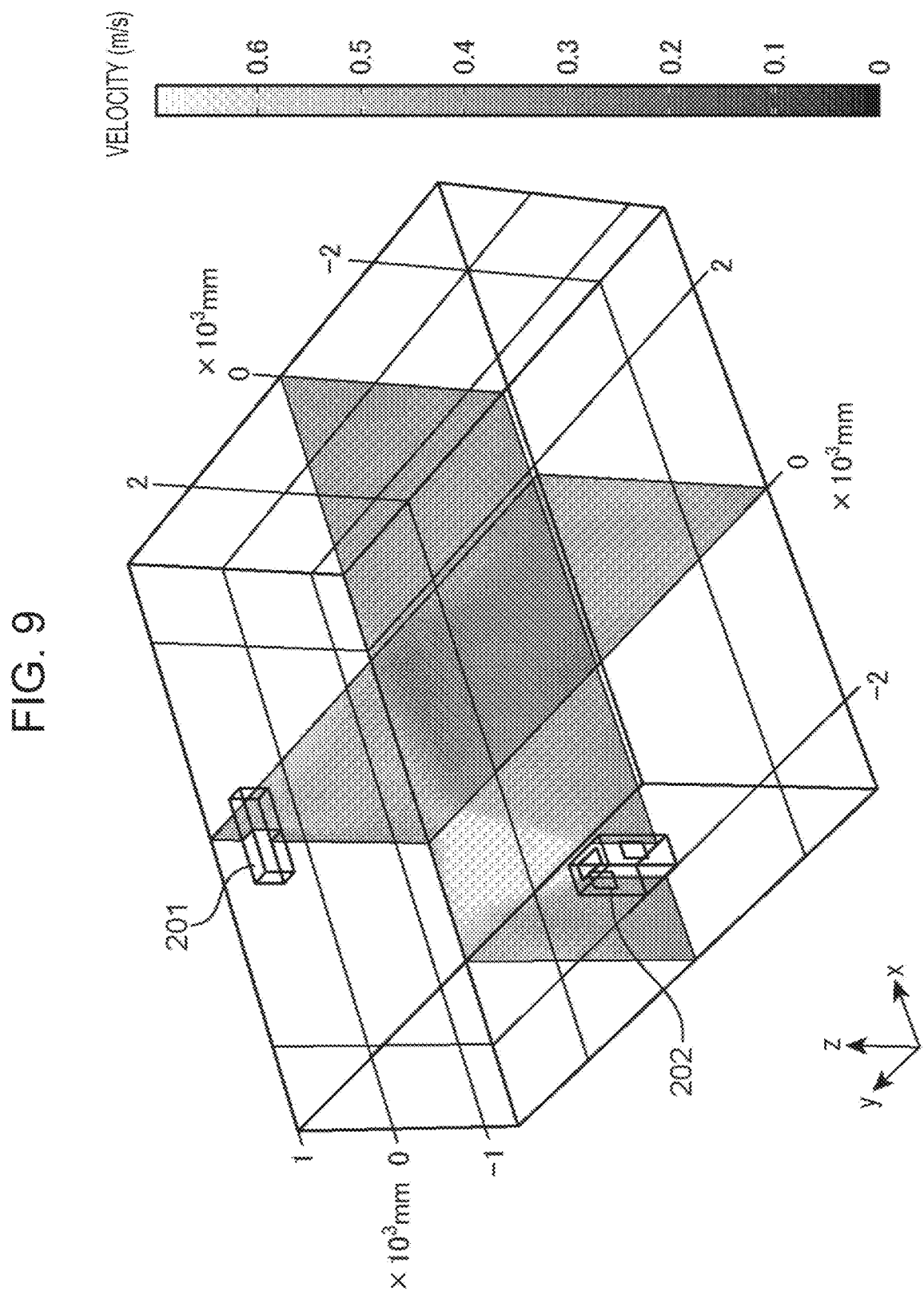

FIG. 11

| STATE AROUND MOUTH | MOUTH IS NOT COVERED | | MOUTH IS COVERED WITH HAND | MOUTH IS COVERED WITH HANDKERCHIEF OR SLEEVE OF JACKET | MOUTH IS COVERED WITH MASK |
|---|---|---|---|---|---|
| FACE ORIENTATION | FORWARD | DOWNWARD | | ALL DIRECTIONS | |
| CONTROL MODE | CONTROL AIR DIRECTION SO THAT AIR IS SENT TO 1 M IN FRONT OF FACE FROM AIRFLOW GENERATION APPARATUS CLOSEST TO TARGET | CONTROL AIR DIRECTION SO THAT AIR IS SENT DOWNWARD AT 90 DEGREES FROM AIRFLOW GENERATION APPARATUS WHICH IS AIR CONDITIONER | CONTROL AIR DIRECTION SO THAT AIR IS SENT TOWARD TARGET FROM AIRFLOW GENERATION APPARATUS CLOSEST TO TARGET | CHANGE OPERATION MODE OF AIRFLOW GENERATION APPARATUS CLOSEST TO TARGET TO POWERFUL OPERATION MODE | CONTROL AIR DIRECTION SO THAT AIR IS SENT TOWARD TARGET FROM AIRFLOW GENERATION APPARATUS CLOSEST TO TARGET |

FIG. 24

| | MOUTH IS NOT COVERED | MOUTH IS COVERED WITH HAND | MOUTH IS COVERED WITH HANDKERCHIEF | MOUTH IS COVERED WITH SLEEVE OF JACKET | MOUTH IS COVERED WITH MASK |
|---|---|---|---|---|---|
| DROPLET INFECTION | 3 | 2 | 1 | 1 | 1 |
| CONTACT INFECTION | 2 | 3 | 1 | 1 | 1 |
| AIRBORNE INFECTION | 3 | 2 | 1 | 2 | 1 |

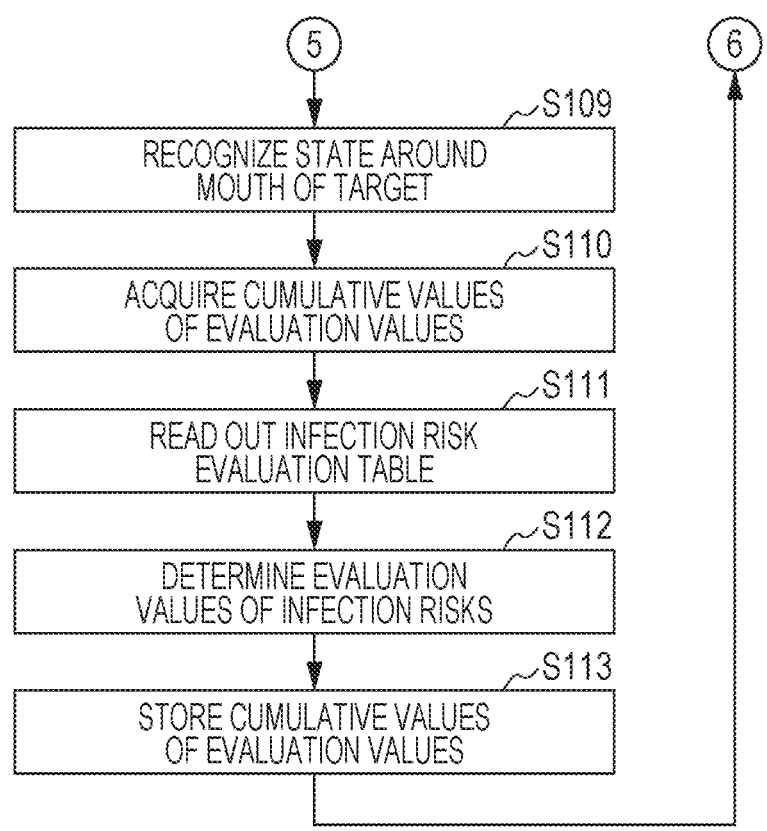

INFORMATION PROCESSING METHOD, RECORDING MEDIUM, AND INFORMATION PROCESSING SYSTEM

BACKGROUND

1. Technical Field

The present disclosure relates to an information processing method, a recording medium, and an information processing system that control an airflow in a predetermined space where a cough or a sneeze has been detected.

2. Description of the Related Art

Various infectious diseases, such as influenza, spread from person to person by, for example, contact infection, droplet infection, or airborne infection. In particular, when an infection case arises in a facility or the like, the case may lead to group infection in the entire facility and thus measures are to be taken quickly. For example, in a facility where many elderly people reside, such as a nursing home, an infectious disease is likely to become severe, and an infected elderly person may die in the worst case. Thus, measures against infectious diseases are taken on an individual basis in nursing homes, for example, caregivers wear masks and pay special attention to hand hygiene. Regarding influenza, a major infection route is considered as droplet infection or airborne infection, and it is important from the viewpoint of measures against the infectious disease whether or not one has been exposed to a cough or a sneeze of an infected person.

For example, Japanese Unexamined Patent Application Publication No. 2017-117416 discloses a technique of detecting whether an infected person has performed a motion of exhaling droplets, determining, if it is detected that the infected person has performed a motion of exhaling droplets, whether or not a subject to be examined was present in a place where the infected person performed the motion of exhaling droplets, and outputting, if it is determined that the subject to be examined was present in the place, identification information of the subject.

In addition, the following document discloses a result of a simulation of how droplets fly when an infected person coughs in a ventilated air-conditioning room: Zhiqiang Kang, Uixian Zhang, Hongbo Fan, Guohui Feng, "Numerical Simulation of Coughed Droplets in the Air-conditioning Room", Procedia Engineering, December 2015, pp. 114-121.

According to the simulation result, when a person coughs at an initial velocity of 10 m/s, droplets reach a receptor at a distance of 1 meter in about 5 seconds, and the receptor is exposed thereto. After that, the droplets spread around the receptor over tens of seconds or more.

Note that, in this document, a ventilation volume larger than usually expected is set as a ventilation condition, and thus a droplet spread time is underestimated. However, it is understood that the movement of droplets is roughly classified into two phases: a first phase in which the droplets fly at high velocity in an unsteady cough airflow for 5 to 10 seconds, and a second phase in which the droplets suddenly decelerate because of air resistance after the first phase and are carried by an indoor airflow.

SUMMARY

In the above-described related art, however, it is not possible to reduce the risk of being infected with an infectious disease in a predetermined space where a cough or a sneeze has been detected, and further improvements are requested.

One non-limiting and exemplary embodiment provides a technique capable of reducing the risk of being infected with an infectious disease in a predetermined space where a cough or a sneeze has been detected.

In one general aspect, the techniques disclosed here feature an information processing method executed by a computer. The information processing method includes detecting a cough or a sneeze of a person who is in a predetermined space; acquiring an image of the predetermined space captured when the cough or the sneeze is detected; recognizing a state around a mouth of the person from the image; generating, based on the recognized state around the mouth of the person, a control signal for controlling at least one of a direction or a volume of air that is to be sent from an airflow generation apparatus that generates an airflow in the predetermined space; and outputting the generated control signal.

It should be noted that general or specific embodiments may be implemented as an apparatus, a system, an integrated circuit, a computer program, a computer-readable recording medium, or any selective combination of an apparatus, a system, a method, an integrated circuit, a computer program, and a computer-readable recording medium. The computer-readable recording medium includes a nonvolatile recording medium, such as a compact disc-read only memory (CD-ROM).

According to one embodiment of the present disclosure, localizing droplets can be dispersed to make the concentration uniform, and thus it is possible to reduce the risk of being infected with an infectious disease in a predetermined space where a cough or a sneeze has been detected.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a first airflow control table in a case where the airflow control system includes one airflow generation apparatus which is an air conditioner;

FIG. 7 is a diagram illustrating an example of a simulation result of an air velocity distribution in a case where, in a space in which an air conditioner and an air purifier are placed, the air purifier is not driven but the air conditioner is driven, and an airflow is generated downward at 90 degrees relative to the horizontal direction.

FIG. 8 is a diagram illustrating an example of a second airflow control table in a case where the airflow control system includes one airflow generation apparatus which is an air purifier;

FIG. 9 is a diagram illustrating an example of a simulation result of an air velocity distribution in a case where, in a space in which an air conditioner and an air purifier are placed, the air conditioner is not driven but the air purifier is driven, and an airflow is generated upward at 90 degrees relative to the horizontal direction;

FIG. 11 is a diagram illustrating an example of a third airflow control table in a case where the airflow control system includes two airflow generation apparatuses which are an air conditioner and an air purifier;

FIG. 24 is a diagram illustrating an example of an infection risk evaluation table stored in an infection risk evaluation table storage unit in the infection risk evaluation system according to the one embodiment of the present disclosure;

FIG. 26 is a second flowchart for describing the operation of the infection risk evaluation apparatus according to the one embodiment of the present disclosure.

DETAILED DESCRIPTION

Figure 1:
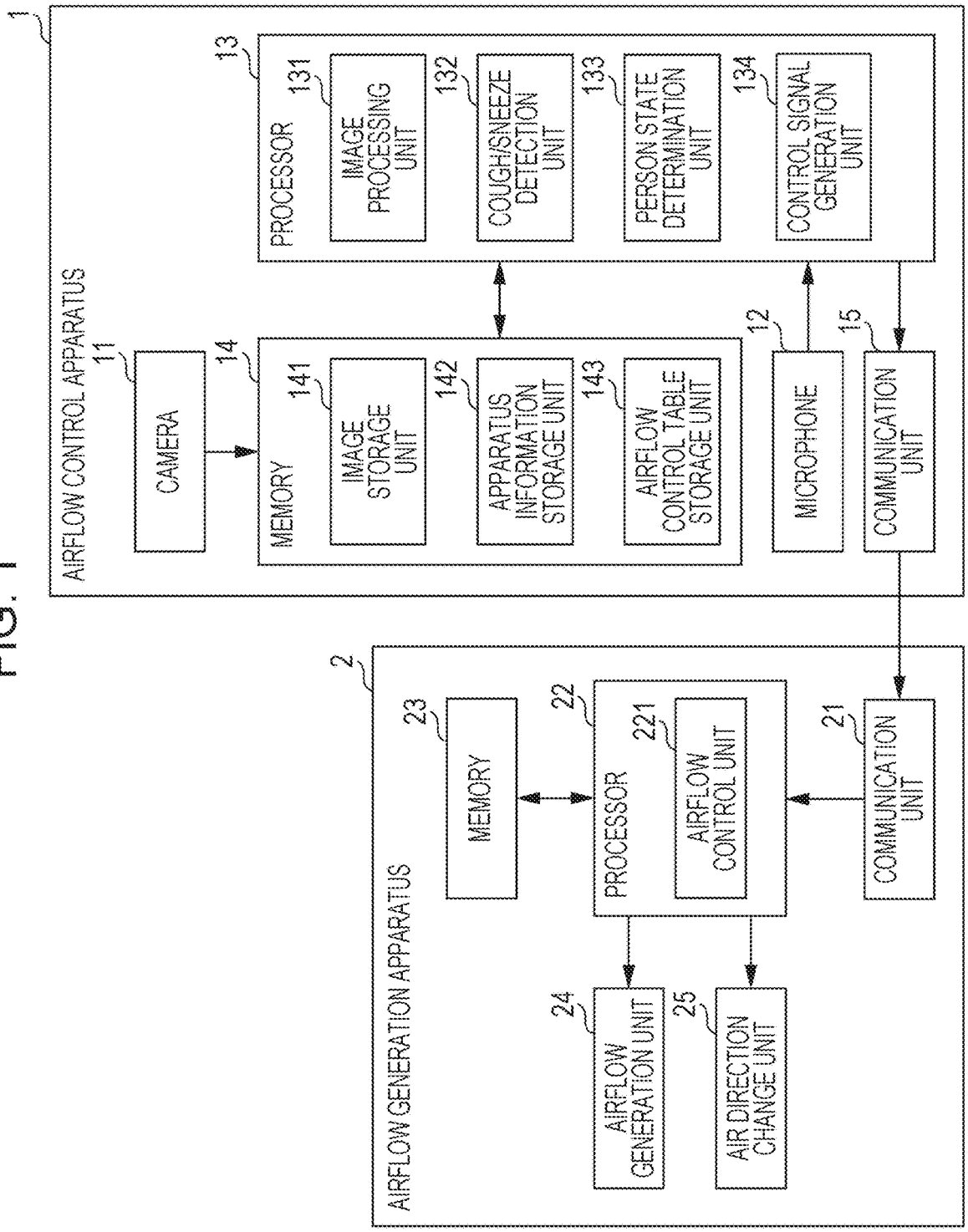
FIG. 1 is a diagram illustrating the configuration of an airflow control system according to a first embodiment of the present disclosure.

Underlying Knowledge Forming Basis of the Present Disclosure

In the above-described related art, it is possible to estimate a person suspected to be infected, but it is difficult to prevent a receptor from being infected before infection. In other words, after a receptor has been exposed to a cough or a sneeze of an infected person, it is difficult to prevent the receptor from being infected by droplet infection or airborne infection.

People cough or sneeze in various states. For example, many people cover a part of the face, such as the nose and mouth, with a hand when coughing or sneezing. In some cases, people cough or sneeze wearing a mask. The movement of droplets varies according to the state of a person who coughs or sneezes.

For example, when an infected person coughs or sneezes with a part of the face covered with a hand, many of droplets do not disperse but adhere to the hand. Droplets with a smaller particle diameter or droplet nuclei may leak through fingers, but the convective velocity thereof is expected to be about the same as the air velocity in the room because of the pressure loss caused by covering with the hand. In other words, in this case, the droplets localize around the infected person and are substantially stationary. In this case, it is important to quickly disperse the droplets remaining around the infected person to the surroundings.

To address the above-described issues, an information processing method according to an aspect of the present disclosure is executed by a computer and includes detecting a cough or a sneeze of a person who is in a predetermined space; acquiring an image of the predetermined space captured when the cough or the sneeze is detected; recognizing a state around a mouth of the person from the image; generating, based on the recognized state around the mouth of the person, a control signal for controlling at least one of a direction or a volume of air that is to be sent from an airflow generation apparatus that generates an airflow in the predetermined space; and outputting the generated control signal.

In this configuration, the state around the mouth of the person when the person coughed or sneezed is recognized from the image acquired when the cough or the sneeze of the person is detected in the predetermined space, and, based the recognized state around the mouth of the person, a control signal for controlling at least one of the direction or volume of air that is to be sent from the airflow generation apparatus that generates an airflow in the predetermined space is generated.

Thus, as a result of generating an airflow at a place where droplets produced by the cough or the sneeze of the person localize, the localizing droplets can be dispersed to make the concentration uniform, and thus it is possible to reduce the risk of being infected with an infectious disease in the predetermined space where the cough or the sneeze has been detected.

In the above information processing method, the recognizing the state around the mouth of the person may include recognizing any one of a state in which the mouth of the person is not covered and a state in which the mouth of the person is covered with a hand.

In this configuration, the place where droplets produced by the cough or the sneeze of the person localize is different between a state in which the mouth of the person is not covered and a state in which the mouth of the person is covered with a hand. Thus, as a result of determining a place where an airflow is to be generated based on whether the state around the mouth of the person is any one of a state in which the mouth of the person is not covered and a state in which the mouth of the person is covered with a hand, it is possible to more reliably disperse the localizing droplets.

In the above information processing method, the recognizing the state around the mouth of the person may include recognizing any one of a state in which the mouth of the person is not covered, a state in which the mouth of the person is covered with a hand, and a state in which the mouth of the person is covered with a mask.

In this configuration, the place where droplets produced by the cough or the sneeze of the person localize is different among a state in which the mouth of the person is not covered, a state in which the mouth of the person is covered with a hand, and a state in which the mouth of the person is covered with a mask. Thus, as a result of determining a place where an airflow is to be generated based on whether the state around the mouth of the person is any one of a state in which the mouth of the person is not covered, a state in which the mouth of the person is covered with a hand, and a state in which the mouth of the person is covered with a mask, it is possible to more reliably disperse the localizing droplets.

In the above information processing method, the recognizing the state around the mouth of the person may include recognizing any one of a state in which the mouth of the person is not covered, a state in which the mouth of the person is covered with a hand, a state in which the mouth of the person is covered with a handkerchief or clothes, and a state in which the mouth of the person is covered with a mask.

In this configuration, the place where droplets produced by the cough or the sneeze of the person localize is different among a state in which the mouth of the person is not covered, a state in which the mouth of the person is covered with a hand, a state in which the mouth of the person is covered with a handkerchief or clothes, and a state in which the mouth of the person is covered with a mask. Thus, as a result of determining a place where an airflow is to be generated based on whether the state around the mouth of the person is any one of a state in which the mouth of the person is not covered, a state in which the mouth of the person is covered with a hand, a state in which the mouth of the person is covered with a handkerchief or clothes, and a state in which the mouth of the person is covered with a mask, it is possible to more reliably disperse the localizing droplets.

The above information processing method may further include recognizing, from the image, an orientation of a face of the person at a time point when the cough or the sneeze of the person is detected, and causing the direction of the air to be different between a case where the face is oriented forward and a case where the face is oriented downward.

In this configuration, because droplets fly in front of the person when the person coughs or sneezes with the face oriented forward whereas droplets localize in a lower part of the predetermined space when the person coughs or sneezes with the face oriented downward, it is possible to accurately generate an airflow at a place where the droplets localize as a result of causing the direction of the air to be sent from the airflow generation apparatus to be different between a case where the face of the person is oriented forward and a case where the face of the person is oriented downward.

The above information processing method may further include calculating position coordinates of the person by using the image, and the control signal may be generated based on the recognized state around the mouth of the person and the position coordinates.

In this configuration, it is possible to more accurately specify the place where the droplets localize based on the state around the mouth of the person and the position coordinates of the person when the cough or the sneeze of the person is detected.

The above information processing method may further include selecting, based on the position coordinates, the airflow generation apparatus from among airflow generation apparatuses.

In this configuration, the airflow generation apparatus includes airflow generation apparatuses. The airflow generation apparatus to be controlled is selected from among the airflow generation apparatuses in accordance with the calculated position coordinates of the person. Thus, for example, as a result of sending air to the place where droplets localize from the airflow generation apparatus closest to the position of the person who has coughed or sneezed among the airflow generation apparatuses, the localizing droplets can be dispersed more efficiently and quickly.

A recording medium according to another aspect of the present disclosure is a recording medium storing a program that causes a computer to execute a process. The recording medium is nonvolatile and computer-readable, and the process includes detecting a cough or a sneeze of a person who is in a predetermined space; acquiring an image of the predetermined space captured when the cough or the sneeze is detected; recognizing a state around a mouth of the person from the image; generating, based on the state around the mouth, a control signal for controlling at least one of a direction or a volume of air that is to be sent from an airflow generation apparatus that generates an airflow in the predetermined space; and outputting the generated control signal.

In this configuration, the state around the mouth of the person when the person coughed or sneezed is recognized from the image acquired when the cough or the sneeze of the person is detected in the predetermined space, and, based the recognized state around the mouth of the person, a control signal for controlling at least one of the direction or volume of air that is to be sent from the airflow generation apparatus that generates an airflow in the predetermined space is generated.

Thus, as a result of generating an airflow at a place where droplets produced by the cough or the sneeze of the person localize, the localizing droplets can be dispersed to make the concentration uniform, and thus it is possible to reduce the risk of being infected with an infectious disease in the predetermined space where the cough or the sneeze has been detected.

An information processing system according to another aspect of the present disclosure includes a camera that captures an image of a predetermined space; an airflow generation apparatus that generates an airflow in the predetermined space; and an information processing apparatus. The information processing apparatus detects a cough or a sneeze of a person who is in the predetermined space, acquires an image of the predetermined space captured by the camera when the cough or the sneeze is detected, recognizes a state around a mouth of the person from the image, generates, based on the state around the mouth, a control signal for controlling at least one of a direction or a volume of air that is to be sent from the airflow generation apparatus, and outputs the generated control signal.

In this configuration, the state around the mouth of the person when the person coughed or sneezed is recognized from the image acquired when the cough or the sneeze of the person is detected in the predetermined space, and, based on the recognized state around the mouth of the person, a control signal for controlling at least one of the direction or volume of air that is to be sent from the airflow generation apparatus that generates an airflow in the predetermined space is generated.

Thus, as a result of generating an airflow at a place where droplets produced by the cough or the sneeze of the person localize, the localizing droplets can be dispersed to make the concentration uniform, and thus it is possible to reduce the risk of being infected with an infectious disease in the predetermined space where the cough or the sneeze has been detected.

Hereinafter, embodiments of the present disclosure will be described with reference to the drawings. The following embodiments are examples of embodying the present disclosure and do not limit the technical scope of the present disclosure.

First Embodiment

FIG. 1 is a diagram illustrating the configuration of an airflow control system according to a first embodiment of the present disclosure. The airflow control system illustrated in FIG. 1 is an example of an information processing system and includes an airflow control apparatus 1 and an airflow generation apparatus 2.

The airflow control apparatus 1 is an example of an information processing apparatus and controls an airflow in a predetermined space. The airflow control apparatus 1 is placed on a wall or a ceiling in the predetermined space. The predetermined space is not specified as long as a camera or the like can be installed therein and may be, for example, a community room of a nursing home or a waiting room of a hospital. Alternatively, the predetermined space may be a relatively small space, such as the inside of a train.

The airflow generation apparatus 2 generates an airflow in the predetermined space. The airflow generation apparatus 2 is, for example, an air conditioner having a cooling and/or heating function, an air purifier having an air purifying function, or a blower having a blowing function. The airflow generation apparatus 2 is placed in the predetermined space. The airflow generation apparatus 2 has a function of changing the direction and volume of air.

The airflow control apparatus 1 is connected to the airflow generation apparatus 2 via a network so as to be capable of communicating with each other. The network is, for example, an intranet or the Internet.

The airflow control apparatus 1 includes a camera 11, a microphone 12, a processor 13, a memory 14, and a communication unit 15.

The camera 11 is installed in the predetermined space and captures an image of the predetermined space. The camera 11 acquires an image of a target who is in the predetermined space. The target is a person staying in the space in which the airflow control apparatus 1 is installed.

The airflow control apparatus 1 does not determine whether or not a target is infected with an infectious disease and handles a target who has coughed or sneezed as an infected person. When a person becomes infected with an infectious disease, he/she experiences an infectious period and then a symptomatic period. The durations of the two periods are usually different from each other. It is difficult for the current technology to determine, before symptoms appear, whether or not a person has infectiousness. A person can be determined to be infected after considerable time has elapsed from when he/she acquires infectiousness. Thus, the term "infected person" is used for an individual having symptoms or an individual who has been confirmed as having infectiousness through some measurement, such as a diagnosis by a doctor.

The camera 11 monitors the inside of a room, is installed on the ceiling or the like so that a target can be detected at a wide angle, and consecutively acquires a moving image of the inside of the room. To capture an image of the entire region of the room, the camera 11 may include a rotary unit for sweeping an image capturing region in a certain time period. The rotary unit enables the single camera 11 to capture an image of the entire region of the room even in a large space of about 36 $m^2$ or more.

The microphone 12 is installed in the predetermined space and collects a sound in the predetermined space. The microphone 12 acquires a sound of a target who is in the predetermined space.

In the first embodiment, the camera 11 and the microphone 12 may be provided inside or outside the airflow control apparatus 1. In a case where the camera 11 and the microphone 12 are provided outside the airflow control apparatus 1, the airflow control apparatus 1 is connected to the camera 11 and the microphone 12 so as to be capable of communicating with each other in a wired or wireless manner.

The processor 13 includes an image processing unit 131, a cough/sneeze detection unit 132, a person state determination unit 133, and a control signal generation unit 134. The memory 14 is, for example, a semiconductor memory, and includes an image storage unit 141, an apparatus information storage unit 142, and an airflow control table storage unit 143.

The image storage unit 141 stores an image captured by the camera 11. The camera 11 captures an image of the predetermined space and stores the image in the image storage unit 141.

The image processing unit 131 acquires the image of the predetermined space from the image storage unit 141. The image processing unit 131 performs image processing on the acquired image and extracts features of a target, such as the face, nose, mouth, hands, and clothes of the target, whether or not the target is wearing a mask, and the position of the target in the room. The image processing unit 131 may use machine learning or deep learning to extract the features, and may use a widely used feature extractor, such as a Haar-Like feature extractor, to detect the face and the like. When extracting the features, the image processing unit 131 detects information about the center-of-gravity positions or areas of the individual extracted features, such as the mouth and face, and information about the position of the target in the room.

The cough/sneeze detection unit 132 detects a cough or a sneeze of a person who is in the predetermined space. When a target coughs or sneezes, the cough/sneeze detection unit 132 detects the cough or the sneeze.

The cough/sneeze detection unit 132 detects that a person has coughed or sneezed in an indoor space. The cough/sneeze detection unit 132 detects a cough or a sneeze of a person who is in the predetermined space by using a sound collected by the microphone 12 and an image captured by the camera 11.

For example, the cough/sneeze detection unit 132 determines whether or not the volume of a sound collected by the microphone 12 is larger than or equal to a threshold value. If the cough/sneeze detection unit 132 determines that the volume of the sound collected by the microphone 12 is larger than or equal to the threshold value, the cough/sneeze detection unit 132 determines that a person who is in the predetermined space has coughed or sneezed. The threshold value may be, for example, 70 dB. The volume to be detected varies according to the distance between the microphone 12 and a person. Thus, the cough/sneeze detection unit 132 may calculate the distance between the microphone 12 and the person by using an image and may correct the threshold value in accordance with the calculated distance.

The cough/sneeze detection unit 132 may perform spectrum analysis on a sound collected by the microphone 12 and may detect a cough or a sneeze on the basis of the analysis result by using an algorithm of machine learning or the like. In this case, a cough or a sneeze can be detected by using a spectrum pattern specific to a cough or a sneeze, and thus detection accuracy increases.

The cough/sneeze detection unit 132 detects at least one of a cough or a sneeze of a person who is in the predetermined space from an image. The camera 11 acquires a moving image. Thus, the cough/sneeze detection unit 132 is capable of detecting a motion pattern of a target by using the features extracted by the image processing unit 131. For example, a person performs a characteristic motion, such as covering the mouth with a hand or closing the eyes, just before coughing or sneezing. Thus, as a result of detecting a characteristic motion at the time of coughing or sneezing, the cough/sneeze detection unit 132 is capable of detecting that a person who is in the predetermined space has coughed or sneezed.

The cough/sneeze detection unit 132 is capable of using a motion pattern detected from an image captured by the camera 11. For example, the cough/sneeze detection unit 132 may make a determination by using a classifier that has learned characteristic motions just before coughing or sneezing by machine learning.

In an easier way, the cough/sneeze detection unit 132 may calculate the distance between the center-of-gravity position of a face and the center-of-gravity position of a hand extracted from an image and may determine whether or not the distance is smaller than or equal to a threshold value.

Figure 2:
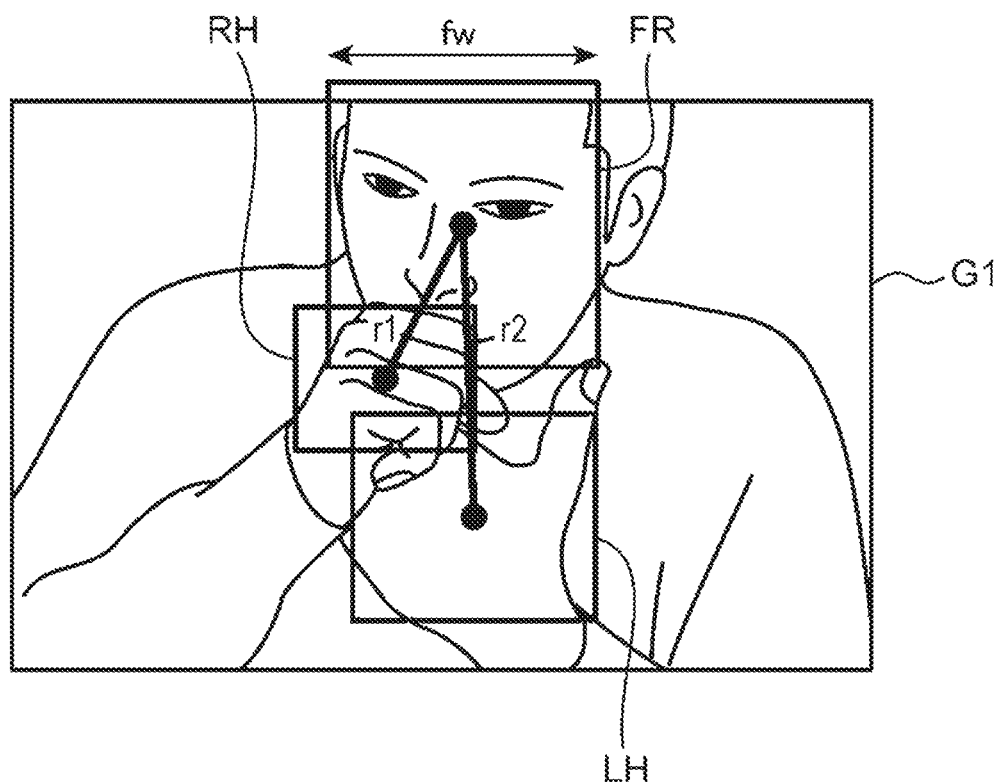
FIG. 2 is a diagram for describing a first method for detecting, from an image, that a target has coughed or sneezed in the first embodiment.

FIG. 2 is a diagram for describing a first method for detecting, from an image, that a target has coughed or sneezed in the first embodiment.

The cough/sneeze detection unit 132 determines whether or not the distance between the position of the face of a person included in an image and the position of one hand of the person included in the image is smaller than or equal to a threshold value. If the cough/sneeze detection unit 132 determines that the distance is smaller than or equal to the threshold value, the cough/sneeze detection unit 132 detects a cough or a sneeze.

First, the image processing unit 131 extracts, from an image G1, a face region FR including the face of a target, a right hand region RH including the right hand of the target, and a left hand region LH including the left hand of the target. At this time, the extracted face region FR, right hand region RH, and left hand region LH are rectangular. Furthermore, the image processing unit 131 calculates the center-of-gravity position of the face region FR, the center-of-gravity position of the right hand region RH, and the center-of-gravity position of the left hand region LH.

The cough/sneeze detection unit 132 determines whether or not a width fw of the face region FR, a distance r1 between the center-of-gravity position of the face region FR and the center-of-gravity position of the right hand region RH, and a distance r2 between the center-of-gravity position of the face region FR and the center-of-gravity position of the left hand region LH satisfy the following expression (1).

$$\min(r1/fw, r2/fw) < 0.5 \qquad (1)$$

In the above expression (1), min( ) is a function that returns a minimum value among given arguments. That is, the cough/sneeze detection unit 132 compares 0.5 with the smaller one of r1/fw and r2/fw.

If the cough/sneeze detection unit 132 determines that the above expression (1) is satisfied, the cough/sneeze detection unit 132 determines that the person who is in the predetermined space has coughed or sneezed. On the other hand, if the cough/sneeze detection unit 132 determines that the above expression (1) is not satisfied, the cough/sneeze detection unit 132 determines that the person who is in the predetermined space has not coughed and that the person who is in the predetermined space has not sneezed.

Alternatively, the cough/sneeze detection unit 132 may determine whether or not the area of the mouth extracted from the image is smaller than or equal to a threshold value.

Figure 3:
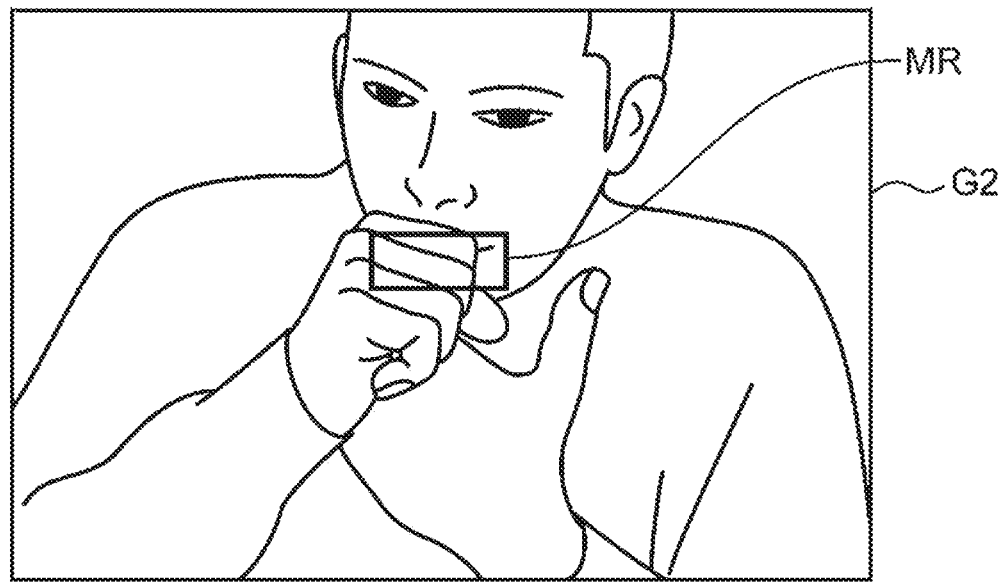
FIG. 3 is a diagram for describing a second method for detecting, from an image, that a target has coughed or sneezed in the first embodiment.

FIG. 3 is a diagram for describing a second method for detecting, from an image, that a target has coughed or sneezed in the first embodiment.

The cough/sneeze detection unit 132 determines whether or not the area of the mouth of a person included in an image is smaller than or equal to a threshold value. If the cough/sneeze detection unit 132 determines that the area is smaller than or equal to the threshold value, the cough/sneeze detection unit 132 may detect a cough or a sneeze.

First, the image processing unit 131 extracts, from an image G2, a mouth region MR including the mouth of a target. At this time, the extracted mouth region MR is rectangular. Furthermore, the image processing unit 131 calculates an area S(t) of the mouth region MR.

The cough/sneeze detection unit 132 determines whether or not the area S(t) of the mouth region MR is smaller than or equal to a threshold value. Specifically, the cough/sneeze detection unit 132 determines whether or not the area S(t) of the mouth region MR and a geometric average value S0 of time-series values of the area of the mouth region MR satisfy the following expression (2).

$$S(t)/S0 < 0.2 \qquad (2)$$

If the cough/sneeze detection unit 132 determines that the above expression (2) is satisfied, the cough/sneeze detection unit 132 determines that the person who is in the predetermined space has coughed or sneezed. On the other hand, if the cough/sneeze detection unit 132 determines that the above expression (2) is not satisfied, the cough/sneeze detection unit 132 determines that the person who is in the predetermined space has not coughed and that the person who is in the predetermined space has not sneezed.

Figure 4:
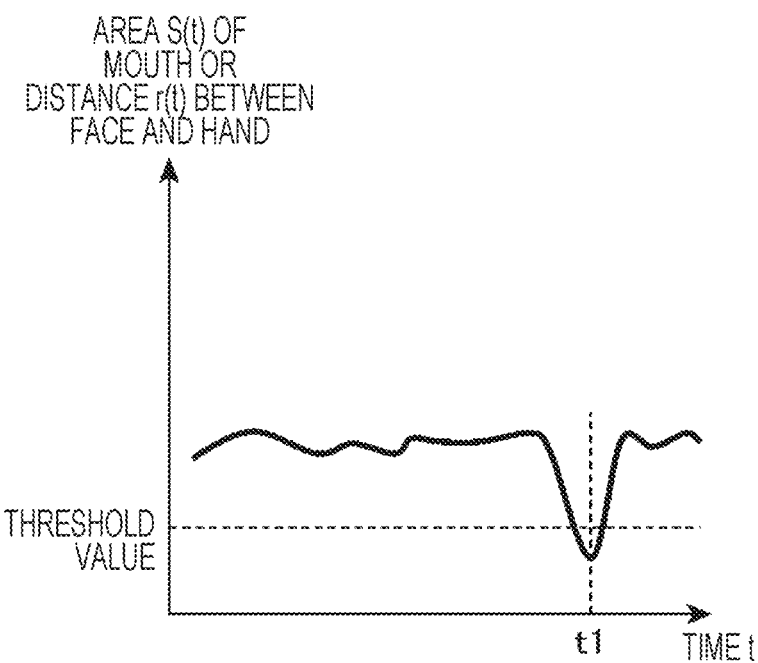
FIG. 4 is a diagram illustrating an example of chronological changes in the area of the mouth of a target or the distance between the face and hand of the target in the first embodiment.

FIG. 4 is a diagram illustrating an example of chronological changes in the area of the mouth of a target or the distance between the face and hand of the target in the first embodiment.

As illustrated in FIG. 4, the area S(t) of the mouth of the target or the distance r(t) between the face and hand of the target is smaller than or equal to the threshold value at time t1. Thus, the cough/sneeze detection unit 132 detects that the target coughed or sneezed at time t1.

The detection method may be switched in accordance with the state of the target. For example, for a person wearing a mask, detection may be performed by using a classifier that has learned by machine learning or by using the distance between the face and hand because the mouth is covered with the mask. The memory 14 may store extracted features or a detected motion pattern, and the control signal generation unit 134 may refer to these pieces of information as necessary.

At the time of extracting features of a person, the area of a mouth or the distance between the mouth and a hand to be detected varies according to the distance between the camera 11 and the person. Thus, the cough/sneeze detection unit 132 may calculate the area of the mouth or the distance between the mouth and hand by using a length standardized on the basis of the width of the face or the like. With use of the standardized length, the cough/sneeze detection unit 132 is capable of determining a cough or a sneeze without depending on the positions of the camera 11 and the target. Alternatively, lattice patterns whose sizes and positions are known may be placed in the predetermined space, and the image processing unit 131 may perform camera calibration on the basis of the sizes and positions of the lattice patterns included in an image. As a result of camera calibration, the absolute position of a target in the predetermined space can be determined more accurately.

The airflow control apparatus 1 may include cameras. Accordingly, an image of a wide range can be captured without causing a single camera to sweep, and also camera calibration is more facilitated.

To increase the accuracy of detecting a cough or a sneeze, the cough/sneeze detection unit 132 detects, from an image and a sound, a cough or a sneeze of a person who is in the predetermined space. For example, if it is determined that the volume of a sound collected by the microphone 12 is larger than or equal to a threshold value and also it is determined that the distance between the positions of the face and one hand of a person included in an image captured by the camera 11 is smaller than or equal to a threshold value, the cough/sneeze detection unit 132 may detect that the target has coughed or sneezed. When a sound is used and an image is not used to detect a cough or a sneeze, a false detection may occur. Use of an image and sound in combination enables the detection accuracy of a cough or a sneeze to increase. The memory 14 may store a detection result of a cough or a sneeze, and the control signal generation unit 134 may refer to the information as necessary.

In the first embodiment, the cough/sneeze detection unit 132 may detect that a target has coughed or sneezed by using a sound collected by the microphone 12 without using an image.

The person state determination unit 133 recognizes, from an image acquired when a cough or a sneeze of a person is detected, the state around the mouth of the person when the person coughed or sneezed.

The person state determination unit 133 recognizes any one of a state in which the mouth of the person is not covered, a state in which the mouth of the person is covered with a hand, a state in which the mouth of the person is covered with a handkerchief or clothes (for example, a sleeve of a jacket), and a state in which the mouth of the person is covered with a mask. In addition, the person state determination unit 133 recognizes, from the image acquired when a cough or a sneeze of the person is detected, the face orientation of the person when the person coughed or sneezed. Furthermore, the person state determination unit 133 calculates, using the image acquired when a cough or a sneeze of the person is detected, the position coordinates of the person in the predetermined space.

The person state determination unit 133 refers to an image acquired when a cough or a sneeze is detected by the cough/sneeze detection unit 132 to recognize the state around the mouth of a target. The state around the mouth of the target is any one of a state in which a part of the face of the target, such as the mouth, is covered with a hand, a state in which a part of the face of the target, such as the mouth, is covered with a handkerchief or a sleeve of clothes, a state in which a part of the face of the target, such as the mouth, is covered with nothing, and a state in which a part of the face of the target, such as the mouth, is covered with a mask when the target coughs or sneezes. The control signal generation unit 134 calculates an airflow control pattern of the airflow generation apparatus 2 on the basis of the state around the mouth of the target.

For example, when the target coughs or sneezes with the mouth covered with a hand, large droplets adhere to the hand, which hardly contributes to droplet infection or airborne infection. However, particles with a small diameter, such as small droplets or droplet nuclei, may leak through fingers. However, covering with the hand increases pressure loss, and thus small particles stay around the target and are gradually discharged by indoor ventilation.

Also, when the target coughs or sneezes with a mask worn thereon, most droplets are collected onto a filter of the mask. However, depending on a mask wearing state, minute particles with a diameter of about 0.3 μm, which are less likely to be collected by the filter, may leak through a gap in the mask.

Thus, when the target coughs or sneezes with the mouth covered with a hand or with a mask worn thereon, there is a possibility that virus particles localize around the target. The localizing virus particles are to be quickly dispersed to suppress airborne infection. Accordingly, for example, when the target coughs or sneezes with the mouth covered with a hand or with a mask worn thereon, the airflow generation apparatus 2 controls the air direction so that air is sent toward the target because the position of the target can be recognized by image processing. Accordingly, the localizing virus particles can be quickly dispersed. The airflow generation apparatus 2 may control the air velocity in addition to the air direction. As a result of controlling the air velocity on the basis of the positional relationship between the target and the airflow generation apparatus 2, an airflow can be controlled more efficiently.

On the other hand, when the target coughs or sneezes with the mouth covered with nothing, droplets or droplet nuclei fly into the space at high velocity in a cough airflow. Statistically the initial velocity of a cough is about 10 m/s and the duration is about 0.5 seconds. Actually, in the above-mentioned non-patent document, 10 m/s is used as the initial velocity of a cough. When the target coughs or sneezes with the mouth covered with nothing, virus particles fly 1 to 1.5 meters in about 5 to 10 seconds and then suddenly decelerate because of air resistance. It is difficult for an airflow to disperse droplets or droplet nuclei within 5 to 10 seconds from the occurrence of a cough or a sneeze. However, after virus particles reach 1 meter ahead of the target, where the virus particles suddenly decelerate because of air resistance, the virus particles localize therearound for tens of seconds or longer. Thus, when the target coughs or sneezes with the mouth covered with nothing, the air direction may be controlled so that air is sent to about 1 to 1.5 meters in front of the target, and thereby small droplets or droplet nuclei that have been decelerated can be dispersed.

When the target coughs or sneezes with the mouth covered with nothing, the direction in which droplets fly varies according to whether the face is oriented forward or downward. When the target coughs or sneezes with the mouth covered with nothing and with the face oriented forward, droplets or droplet nuclei reach 1 to 1.5 meters ahead in about 5 to 10 seconds and then suddenly decelerate, as described above. Due to the inertia, droplets with a large particle diameter decelerate late and reach a farther point than small droplets do. When the target coughs or sneezes with the mouth covered with nothing and with the face oriented downward, droplets or droplet nuclei stay in a lower part of the room.

Thus, the person state determination unit 133 determines the face orientation of the target. As a result of controlling an airflow in accordance with the face orientation, airborne infection can be efficiently suppressed. In a case where there are airflow generation apparatuses 2, the airflow generation apparatus 2 closest to the target may be used to suppress airborne infection more efficiently.

As described above, the position where droplets stay varies according to the state around the mouth of a person and the face orientation of the person when the person coughs or sneezes.

The person state determination unit 133 performs image processing on an image corresponding to a time before or after the time point when a cough or a sneeze of the target is detected, to classify the state around the mouth of the target into one of patterns. For example, the person state determination unit 133 performs pattern classification by using an algorithm obtained through machine learning. With use of the algorithm obtained through machine learning, pattern classification can be performed with high accuracy.

In an easier way, the person state determination unit 133 may determine the state around the mouth of the person by using an image processing algorithm. As the image processing algorithm, for example, a Haar-Like feature extractor can be used to detect a face, a mouth, and a hand, or color extraction can be used to detect a mask, a handkerchief, and a sleeve of a jacket. Use of such a simple image processing algorithm eliminates the necessity of a supervised learning process that is necessary for machine leaning, and thus the algorithm can be easily loaded into the system.

After the state around the mouth of the target has been classified in this manner, airflow control for suppressing airborne infection is performed. At this time, the best control method varies according to the types, the number, and the positional relationship of airflow generation apparatuses 2 installed in the room.

The apparatus information storage unit 142 stores apparatus information in which type information of an airflow generation apparatus placed in the predetermined space is associated with position information of the airflow generation apparatus in the predetermined space. The type information of an airflow generation apparatus is information indicating whether the airflow generation apparatus placed in the predetermined space is an air conditioner having a cooling and/or heating function, an air purifier having an air purifying function, or a blower having a blowing function. The position information of an airflow generation apparatus is represented by, for example, coordinates in the predetermined space. The apparatus information makes it possible to recognize the number of airflow generation apparatuses present in the predetermined space.

The control signal generation unit 134 generates a control signal for controlling at least one of the direction or volume of air that is to be sent from the airflow generation apparatus 2 that generates an airflow in the predetermined space, on the basis of the state around the mouth of the person recognized by the person state determination unit 133. The control signal generation unit 134 causes the direction of the air to be sent from the airflow generation apparatus 2 to be different between a case where the face of the person is oriented forward and a case where the face of the person is oriented downward. Furthermore, the control signal generation unit 134 generates a control signal on the basis of the state around the mouth of the person recognized by the person state determination unit 133 and the position coordinates calculated by the person state determination unit 133.

The airflow control table storage unit 143 stores an airflow control table in which the states around the mouth of a person, the face orientations of the person, and control modes of the airflow generation apparatus are associated with each other. The airflow control table associates situations in which a target coughs or sneezes with control modes of the airflow generation apparatus for suppressing airborne infection in the predetermined space.

The control signal generation unit 134 acquires, from the airflow control table stored in the airflow control table storage unit 143, a control mode corresponding to the state around the mouth of the person and the face orientation of the person recognized by the person state determination unit 133, and generates a control signal for controlling the airflow generation apparatus 2 in the acquired control mode.

The control signal generation unit 134 outputs the generated control signal to the communication unit 15. The communication unit 15 transmits the control signal generated by the control signal generation unit 134 to the airflow generation apparatus 2.

In the first embodiment, the control mode of an airflow generation apparatus varies according to the type of airflow generation apparatus and the number of airflow generation apparatuses. Hereinafter, a description will be given of an airflow control table in a case where the airflow control system includes one airflow generation apparatus which is an air conditioner, an airflow control table in a case where the airflow control system includes one airflow generation apparatus which is an air purifier, and an airflow control table in a case where the airflow control system includes two airflow generation apparatuses which are an air conditioner and an air purifier.

FIG. 5 is a diagram illustrating an example of a first airflow control table in a case where the airflow control system includes one airflow generation apparatus which is an air conditioner. The air conditioner is placed on a wall near a ceiling in the predetermined space. The air conditioner sends air downward relative to the horizontal direction.

As illustrated in FIG. 5, a state in which the mouth is not covered and the face is oriented forward is associated with a control mode in which the air direction is controlled so that air is sent to 1 meter in front of the face.

Specifically, in a case where a part of the face of a target, such as the mouth, is covered with nothing and the face is oriented forward when a cough or a sneeze is detected, droplets exhaled by the target reach 1 to 1.5 meters in front of the face of the target in around 5 seconds. After that, droplets with a small particle diameter receive air resistance of drag and localize around there for a while. Accordingly, the airflow generation apparatus 2 controls the air direction so that air is sent to 1 meter in front of the face of the target, and thereby being capable of dispersing the localizing droplets and suppressing airborne infection.

Thus, in a case where the mouth is not covered and the face is oriented forward, the control signal generation unit 134 generates a control signal for controlling the air direction so that air is sent to 1 meter in front of the face of the target. For example, in a case where the airflow generation apparatus 2 is an air conditioner and the air conditioner includes a louver, the airflow generation apparatus 2 adjusts the angle of the louver to control the air direction so that air is sent to 1 meter in front of the face of the target. Accordingly, airborne infection can be suppressed.

Figure 6:
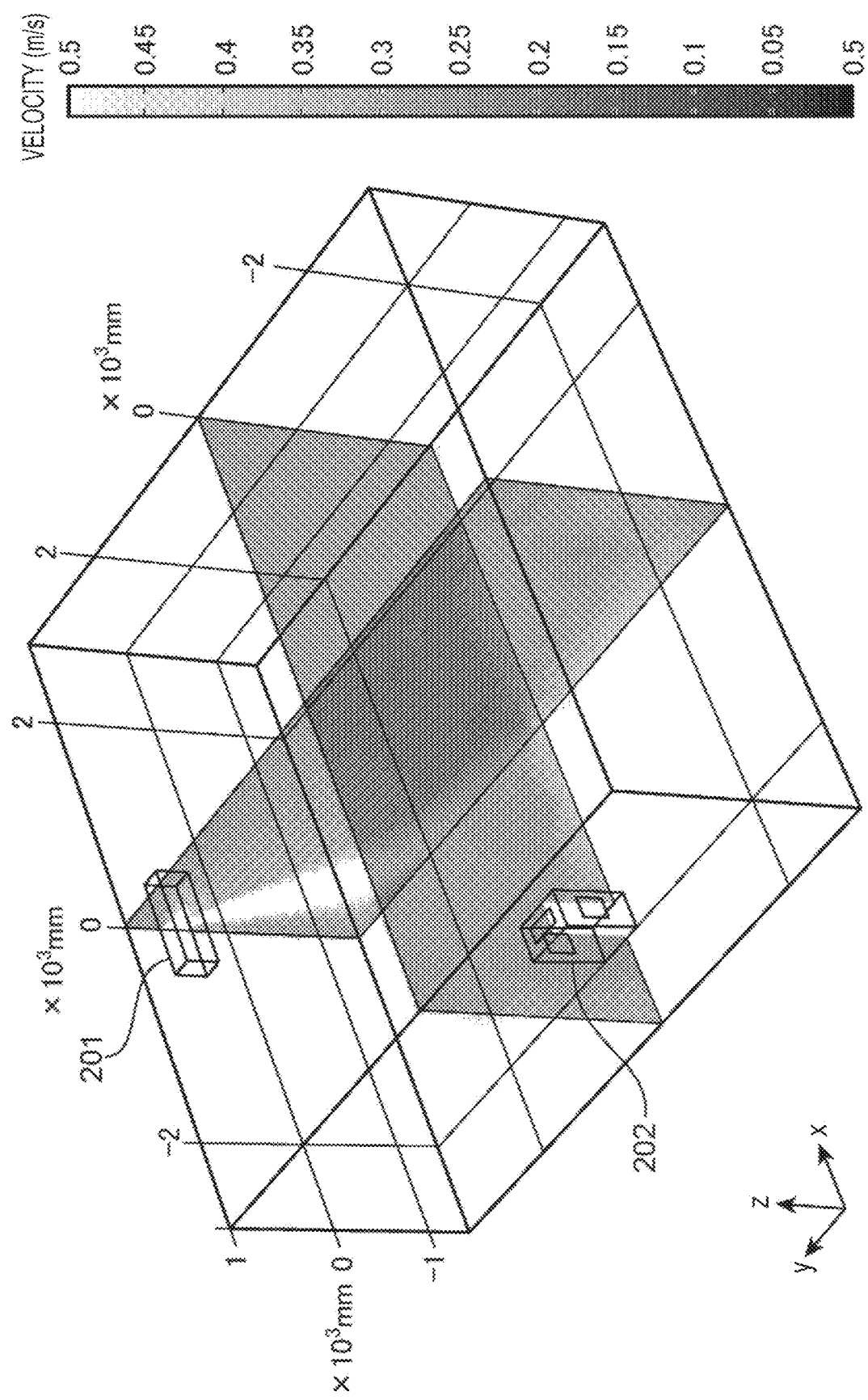
FIG. 6 is a diagram illustrating an example of a simulation result of an air velocity distribution in a case where, in a space in which an air conditioner and an air purifier are placed, the air purifier is not driven but the air conditioner is driven, and an airflow is generated in the direction of 30 degrees relative to the horizontal direction.

FIG. 6 is a diagram illustrating an example of a simulation result of an air velocity distribution in a case where, in a space in which an air conditioner and an air purifier are placed, the air purifier is not driven but the air conditioner is driven, and an airflow is generated in the direction of 30 degrees relative to the horizontal direction. The air velocity distribution illustrated in FIG. 6 is a result of a simulation using computational fluid dynamics (CFD).

In FIG. 6, an air conditioner 201 and an air purifier 202 are placed in a space of about 36 m². The air conditioner 201 sends air downward at 30 degrees relative to the horizontal direction. For numerical calculation, COMSOL Multiphysics is used, which is commercial simulation software using the finite element method. As is clear from FIG. 6, controlling of the louver of the air conditioner 201 enables an airflow to be generated at a desired position in the space.

Referring back to FIG. 5, a state in which the mouth is not covered and the face is oriented downward is associated with a control mode in which the air direction is controlled so that air is sent downward at 90 degrees.

Specifically, in a case where a part of the face of a target, such as the mouth, is covered with nothing and the face is oriented downward when a cough or a sneeze is detected, droplets localize in a lower part of the room. In this case, a receptor with a height of at least more than 150 cm, such as an ordinary adult, has a low risk of airborne infection, whereas a receptor with a relatively small height, such as a child of elementary age or younger, or a receptor with low resistance has a high risk of airborne infection. The air conditioner is usually installed near the ceiling of a room, and thus the air direction can be controlled downward at 90 degrees. Accordingly, the airflow generation apparatus 2 controls the air direction so that air is sent downward at 90 degrees relative to the horizontal direction, and thereby being capable of dispersing droplets localizing in a lower part of the room and suppressing airborne infection.

Thus, in a case where the mouth is not covered and the face is oriented downward, the control signal generation unit 134 generates a control signal for controlling the air direction of the airflow generation apparatus 2 to vertically downward. For example, in a case where the airflow generation apparatus 2 is an air conditioner and the air conditioner includes a louver, the airflow generation apparatus 2 adjusts the angle of the louver to control the air direction of the air conditioner to vertically downward. Accordingly, a region with a high air velocity can be generated near the floor of the room, and the droplets localizing in a lower part of the room can be efficiently dispersed.

FIG. 7 is a diagram illustrating an example of a simulation result of an air velocity distribution in a case where, in a space in which an air conditioner and an air purifier are placed, the air purifier is not driven but the air conditioner is driven, and an airflow is generated downward at 90 degrees relative to the horizontal direction. The air velocity distribution illustrated in FIG. 7 is a result of a simulation using CFD.

In FIG. 7, the air conditioner 201 and the air purifier 202 are placed in a space of about 36 m². The air conditioner 201 sends air downward at 90 degrees relative to the horizontal direction. For numerical calculation, COMSOL Multiphysics is used, which is commercial simulation software using the finite element method. As is clear from FIG. 7, sending of air in a vertically downward direction from the air conditioner 201 enables a region with a high air velocity to be generated at a height of about tens of cm from the floor surface.

Referring back to FIG. 5, a state in which the mouth is covered with a hand is associated with a control mode in which the air direction is controlled so that air is sent toward the target.

Specifically, in a case where a part of the face of the target, such as the mouth, is covered with a hand when a cough or a sneeze is detected, spread of droplets can be suppressed but the droplets localize around the target. Accordingly, the airflow generation apparatus 2 sends air toward the target, and thereby being capable of quickly dispersing the droplets localizing near the target and suppressing airborne infection.

Thus, in a case where the mouth is covered with a hand, the control signal generation unit 134 generates a control signal for controlling the air direction so that air is sent toward the target. For example, in a case where the airflow generation apparatus 2 is an air conditioner and the air conditioner includes a louver, the airflow generation apparatus 2 adjusts the angle of the louver to control the air direction so that air is sent toward the target. Accordingly, airborne infection can be suppressed.

As illustrated in FIG. 5, a state in which the mouth is covered with a handkerchief or a sleeve of a jacket is associated with a control mode in which an operation mode is changed to a powerful operation mode.

Specifically, in a case where a part of the face of a target, such as the mouth, is covered with a handkerchief or a sleeve of a jacket when a cough or a sneeze is detected, droplets adhere to the handkerchief or the sleeve of the jacket. In this case, spread of the droplets can be suppressed, but some of virus particles adhered to the handkerchief or the sleeve of the jacket spread into the space. Accordingly, the airflow generation apparatus 2 operates in the powerful operation mode for a predetermined time period, thereby being capable of making the concentration of the spread virus particles uniform and suppressing airborne infection.

Thus, in a case where the mouth is covered with a handkerchief or a sleeve of a jacket, the control signal generation unit 134 generates a control signal for changing the operation mode to the powerful operation mode. For example, in a case where the airflow generation apparatus 2 is an air conditioner, the airflow generation apparatus 2 adjusts the air velocity so as to increase the velocity at which air is sent, and adjusts the air volume so as to increase the volume of air to be sent. Accordingly, a droplet distribution in the room can be made uniform and airborne infection can be suppressed.

As illustrated in FIG. 5, a state in which the mouth is covered with a mask is associated with a control mode in which the air direction is controlled so that air is sent toward the target.

Specifically, in a case where the target is wearing a mask when a cough or a sneeze is detected, many droplets are collected onto the filter of the mask, but minute particles with a diameter of about 0.3 μm, which are less likely to be collected onto the filter, leak from the mask. Also in a case where the mask is improperly worn, minute particles leak through a gap in the mask. That is, the leaked droplets localize around the target. Accordingly, the airflow generation apparatus 2 sends air toward the target, and thereby being capable of quickly dispersing the droplets localizing around the target and suppressing airborne infection.

Thus, in a case where the mouth is covered with a mask, the control signal generation unit 134 generates a control signal for controlling the air direction so that air is sent toward the target. For example, in a case where the airflow generation apparatus 2 is an air conditioner and the air conditioner includes a louver, the airflow generation apparatus 2 adjusts the angle of the louver to control the air direction so that air is sent toward the target. Accordingly, airborne infection can be suppressed.

FIG. 8 is a diagram illustrating an example of a second airflow control table in a case where the airflow control system includes one airflow generation apparatus which is an air purifier. The air purifier is installed on the floor in a space. The air purifier sends purified air upward relative to the horizontal direction from an upper portion of the air purifier.

As illustrated in FIG. 8, a state in which the mouth is not covered and the face is oriented forward is associated with a control mode in which the air direction is controlled so that air is sent to 1 meter in front of the face.

Specifically, in a case where a part of the face of a target, such as the mouth, is covered with nothing and the face is oriented forward when a cough or a sneeze is detected, droplets with a small particle diameter localize 1 to 1.5 m in front of the face of the target. Accordingly, the airflow generation apparatus 2 controls the air direction so that air is sent to 1 meter in front of the face of the target, and thereby being capable of dispersing the localizing droplets and suppressing airborne infection.

Thus, in a case where the mouth is not covered and the face is oriented forward, the control signal generation unit 134 generates a control signal for controlling the air direction so that air is sent to 1 meter in front of the face of the target. For example, in a case where the airflow generation apparatus 2 is an air purifier and the air purifier includes a louver, the airflow generation apparatus 2 adjusts the angle of the louver to control the air direction so that air is sent to 1 meter in front of the face of the target. Accordingly, airborne infection can be suppressed.

Figure 10:
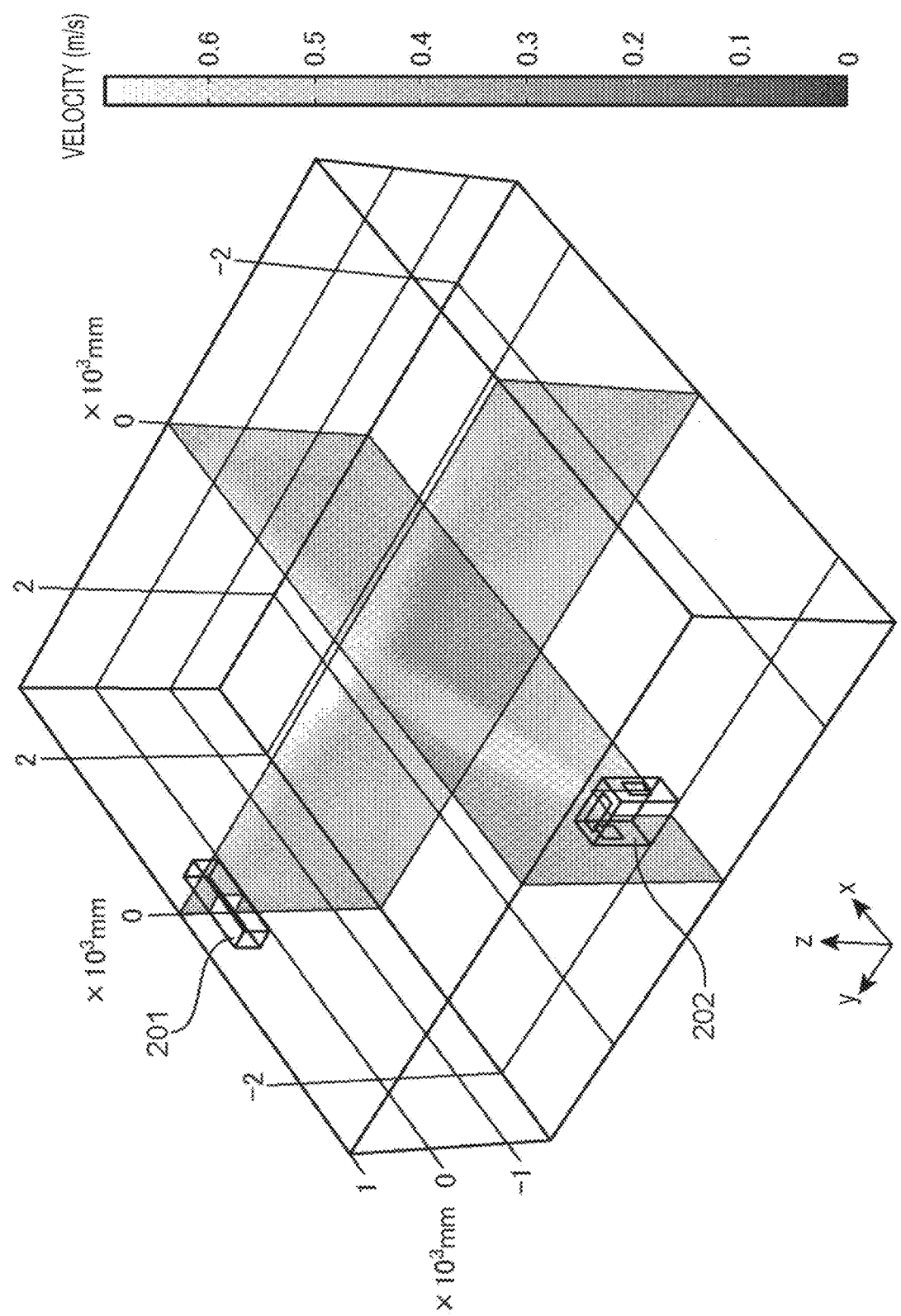
FIG. 10 is a diagram illustrating an example of a simulation result of an air velocity distribution in a case where, in a space in which an air conditioner and an air purifier are placed, the air conditioner is not driven but the air purifier is driven, and an airflow is generated upward at 45 degrees relative to the horizontal direction.

FIG. 9 is a diagram illustrating an example of a simulation result of an air velocity distribution in a case where, in a space in which an air conditioner and an air purifier are placed, the air conditioner is not driven but the air purifier is driven, and an airflow is generated upward at 90 degrees relative to the horizontal direction. FIG. 10 is a diagram illustrating an example of a simulation result of an air velocity distribution in a case where, in a space in which an air conditioner and an air purifier are placed, the air conditioner is not driven but the air purifier is driven, and an airflow is generated upward at 45 degrees relative to the horizontal direction. The air velocity distributions illustrated in FIG. 9 and FIG. 10 are results of simulations using CFD.

In FIG. 9 and FIG. 10, the air conditioner 201 and the air purifier 202 are placed in a space of about 36 m². For numerical calculation, COMSOL Multiphysics is used, which is commercial simulation software using the finite element method. In FIG. 9, the air purifier 202 sends air in a vertically upward direction by controlling the louver. In FIG. 10, the air purifier 202 sends air in the direction of 45 degrees relative to the horizontal direction by controlling the louver. As is clear from FIG. 9 and FIG. 10, controlling of the air direction of the louver of the air purifier 202 enables an airflow to be generated at a desired position in the space.

Referring back to FIG. 8, a state in which the mouth is not covered and the face is oriented downward is associated with a control mode in which the operation mode is changed to a powerful operation mode.

Specifically, in a case where a part of the face, such as the mouth, is covered with nothing and the face is oriented downward when a cough or a sneeze is detected, droplets localize in a lower part of the room. The air purifier is installed on the floor in the predetermined space. In many air purifiers, the direction of an airflow controlled by the louver is the horizontal direction or an upward direction relative to the horizontal direction.

Thus, in a case where the mouth is not covered, the face is oriented downward, and the airflow generation apparatus 2 is an air purifier, the control signal generation unit 134 generates a control signal for changing the operation mode to the powerful operation mode. In a case where the airflow generation apparatus 2 is an air purifier, the airflow generation apparatus 2 is incapable of controlling the air direction to a vertically downward direction, and thus changes the operation mode to the powerful operation mode. Accordingly, an airflow in the entire room can be circulated to indirectly promote dispersion of droplets. In addition, many air purifiers capture air from a lower portion or side surface of the main body. Thus, as a result of changing the operation mode to the powerful operation mode, a larger volume of air is captured from the lower portion or side surface of the air purifier, and thus the droplets localizing in a lower part of the room can be efficiently collected or dispersed.

As illustrated in FIG. 8, a state in which the mouth is covered with a hand is associated with a control mode in which the air direction is controlled so that air is sent toward the target. As illustrated in FIG. 8, a state in which the mouth is covered with a handkerchief or a sleeve of a jacket is associated with a control mode in which an operation mode is changed to a powerful operation mode. As illustrated in FIG. 8, a state in which the mouth is covered with a mask is associated with a control mode in which the air direction is controlled so that air is sent toward the target.

The control modes in cases where a part of the face of a target, such as the mouth, is covered with a hand, a handkerchief or a sleeve of a jacket, and a mask when a cough or a sneeze is detected are the same as in the case where the airflow control system includes one air conditioner, and thus the description thereof is omitted.

FIG. 11 is a diagram illustrating an example of a third airflow control table in a case where the airflow control system includes two airflow generation apparatuses which are an air conditioner and an air purifier. The air conditioner is placed on a wall near a ceiling in the predetermined space. The air conditioner sends air downward relative to the horizontal direction. The air purifier is installed on the floor in the space. The air purifier sends purified air upward relative to the horizontal direction from an upper portion of the air purifier.

In this case, it is possible to consider the distance between a target and an airflow generation apparatus in addition to a state of the target, and the best condition is selected from among the conditions shown in the airflow control tables described above.

As illustrated in FIG. 11, a state in which the mouth is not covered and the face is oriented forward is associated with a control mode in which the air direction is controlled so that air is sent to 1 meter in front of the face from the airflow generation apparatus closest to the target.

Specifically, in a case where a part of the face, such as the mouth, is covered with nothing and the face is oriented forward when a cough or a sneeze is detected, the airflow generation apparatus closest to the target is selected from among the airflow generation apparatuses, and the air direction is controlled by using a louver or the like of the selected airflow generation apparatus so that air is sent to 1 m in front of the face of the target. Accordingly, airborne infection can be suppressed in an earlier stage.

In this case, the control signal generation unit 134 generates a control signal on the basis of a recognized state around the mouth of the person and calculated position coordinates. In addition, the control signal generation unit 134 selects, in accordance with the calculated position coordinates, the airflow generation apparatus to be controlled from among the airflow generation apparatuses.

Thus, in a case where the mouth is not covered and the face is oriented forward, the control signal generation unit 134 selects the airflow generation apparatus closest to the target from among the airflow generation apparatuses, and generates a control signal for controlling the air direction so that air is sent to 1 meter in front of the face of the target from the selected airflow generation apparatus. The communication unit 15 transmits the control signal to the selected airflow generation apparatus.

As illustrated in FIG. 11, a state in which the mouth is not covered and the face is oriented downward is associated with a control mode in which the air direction is controlled so that air is sent downward at 90 degrees from the airflow generation apparatus which is an air conditioner.

Specifically, in a case where a part of the face, such as the mouth, is covered with nothing and the face is oriented downward when a cough or a sneeze is detected, an airflow generation apparatus which is an air conditioner is selected from among the airflow generation apparatuses, and the air direction is controlled to a vertically downward direction by using a louver or the like of the selected airflow generation apparatus. Accordingly, it is possible to disperse the droplets localizing in a lower part of the room.

Thus, in a case where the mouth is not covered and the face is oriented downward, the control signal generation unit 134 selects an airflow generation apparatus which is an air conditioner from among the airflow generation apparatuses and generates a control signal for controlling the air direction of the selected airflow generation apparatus to a vertically downward direction. The communication unit 15 transmits the control signal to the selected airflow generation apparatus.

In a case where there is not an air conditioner among the airflow generation apparatuses and all the airflow generation apparatuses are air purifiers, the control signal generation unit 134 may select the airflow generation apparatus closest to the target from among the airflow generation apparatuses and may generate a control signal for changing the operation mode of the selected airflow generation apparatus to the powerful operation mode.

As illustrated in FIG. 11, a state in which the mouth is covered with a hand or a mask is associated with a control mode in which the air direction is controlled so that air is sent from the airflow generation apparatus closest to the target toward the target.

Specifically, in a case where the target covers a part of the face, such as the mouth, with a hand or is wearing a mask when a cough or a sneeze is detected, droplets localize around the target. Accordingly, the airflow generation apparatus closest to the target is selected from among the airflow generation apparatuses, and the air direction is controlled by using a louver or the like of the selected airflow generation apparatus so that air is sent toward the target. Accordingly, the droplets localizing around the target can be quickly dispersed.

Thus, in a case where the mouth is covered with a hand or a mask, the control signal generation unit 134 selects the airflow generation apparatus closest to the target from among the airflow generation apparatuses and generates a control signal for controlling the air direction so that air is sent from the selected airflow generation apparatus toward the target. The communication unit 15 transmits the control signal to the selected airflow generation apparatus.

As illustrated in FIG. 11, a state in which the mouth is covered with a handkerchief or a sleeve of a jacket is associated with a control mode in which the operation mode of the airflow generation apparatus closest to the target is changed to a powerful operation mode.

Specifically, in a case where the target covers a part of the face, such as the mouth, with a handkerchief or a sleeve of a jacket when a cough or a sneeze is detected, the operation mode of the airflow generation apparatus closest to the target is changed to the powerful operation mode. Accordingly, droplets can be efficiently removed.

Thus, in a case where the mouth is covered with a handkerchief or a sleeve of a jacket, the control signal generation unit 134 selects the airflow generation apparatus closest to the target from among the airflow generation apparatuses and generates a control signal for changing the operation mode of the selected airflow generation apparatus to the powerful operation mode. The communication unit 15 transmits the control signal to the selected airflow generation apparatus. For example, the airflow generation apparatus adjusts the air velocity so as to increase the velocity at which air is sent or adjusts the air volume so as to increase the air to be sent.

At this time, there is a possibility that the target moves around in the room, and the airflow generation apparatus closest to the target may vary according to time. In such a case, the control signal generation unit 134 may calculate the distances between the target and the individual airflow generation apparatuses, select the airflow generation apparatus closest to the target, and change the operation mode of the selected airflow generation apparatus, at certain time intervals. Accordingly, droplets can be efficiently dispersed in accordance with a motion of the target.

The first airflow control table, the second airflow control table, and the third airflow control table according to the first embodiment are examples. The third airflow control table can be used for not only an airflow control system including one air conditioner and one air purifier but also an airflow control system including air conditioners or an airflow control system including air purifiers.

Next, the airflow generation apparatus 2 illustrated in FIG. 1 will be described.

The airflow generation apparatus 2 generates an airflow in a predetermined space. The airflow generation apparatus 2 is, for example, an air conditioner or an air purifier. The airflow generation apparatus 2 may be an air curtain or a DC fan that is provided in a room to generate a specific airflow pattern. In this case, airflow control can be performed more easily by contriving the installation place of the airflow generation apparatus 2 in advance. The airflow control system may include airflow generation apparatuses. Accordingly, more complex airflow control can be performed.

The airflow generation apparatus 2 includes a communication unit 21, a processor 22, a memory 23, an airflow generation unit 24, and an air direction change unit 25.

The communication unit 21 communicates with the airflow control apparatus 1 and receives a control signal transmitted by the airflow control apparatus 1. The control signal mainly includes an instruction to change the direction or volume of the air to be sent from the airflow generation apparatus 2, and may include an instruction to turn on the power of the airflow generation apparatus 2 that is in an OFF state.

The communication unit 21 may transmit the position of the airflow generation apparatus 2 to the airflow control apparatus 1. Accordingly, the positional relationship between a target and the airflow generation apparatus 2 can be utilized for calculation in airflow control. In addition, when there are airflow generation apparatuses 2, airflow control can be performed more efficiently by controlling the airflow generation apparatus 2 closest to the target.

The processor 22 includes an airflow control unit 221. The airflow control unit 221 controls the airflow generation unit 24 and the air direction change unit 25 in accordance with a control signal received by the communication unit 21.

The memory 23 is, for example, a semiconductor memory, and stores various pieces of information. In the case of temporarily changing the operation mode of the airflow generation apparatus 2, the airflow control unit 221 stores control parameters in the operation mode before the change in the memory 23. In the case of returning the operation mode of the airflow generation apparatus 2 to the operation mode before the change, the airflow control unit 221 reads out the control parameters used before the change and stored in the memory 23 and changes the control parameters to the read out control parameters.

The airflow generation unit 24 is, for example, a fan motor, and sends air into the predetermined space. In a case where the airflow generation apparatus 2 is an air conditioner, the airflow generation unit 24 may send warm air or cool air generated by refrigerant into the predetermined space or may send taken air as is. In a case where the airflow generation apparatus 2 is an air purifier, the airflow generation unit 24 sends purified air into the predetermined space.

The air direction change unit 25 controls an airflow generated by the airflow generation unit 24. The air direction change unit 25 controls an air direction. The air direction change unit 25 is, for example, a louver. The air direction change unit 25 adjusts the orientation of the louver to change the direction of the air sent from the airflow generation unit 24.

Next, the operation of the airflow control apparatus 1 according to the first embodiment will be described.

Figure 12:
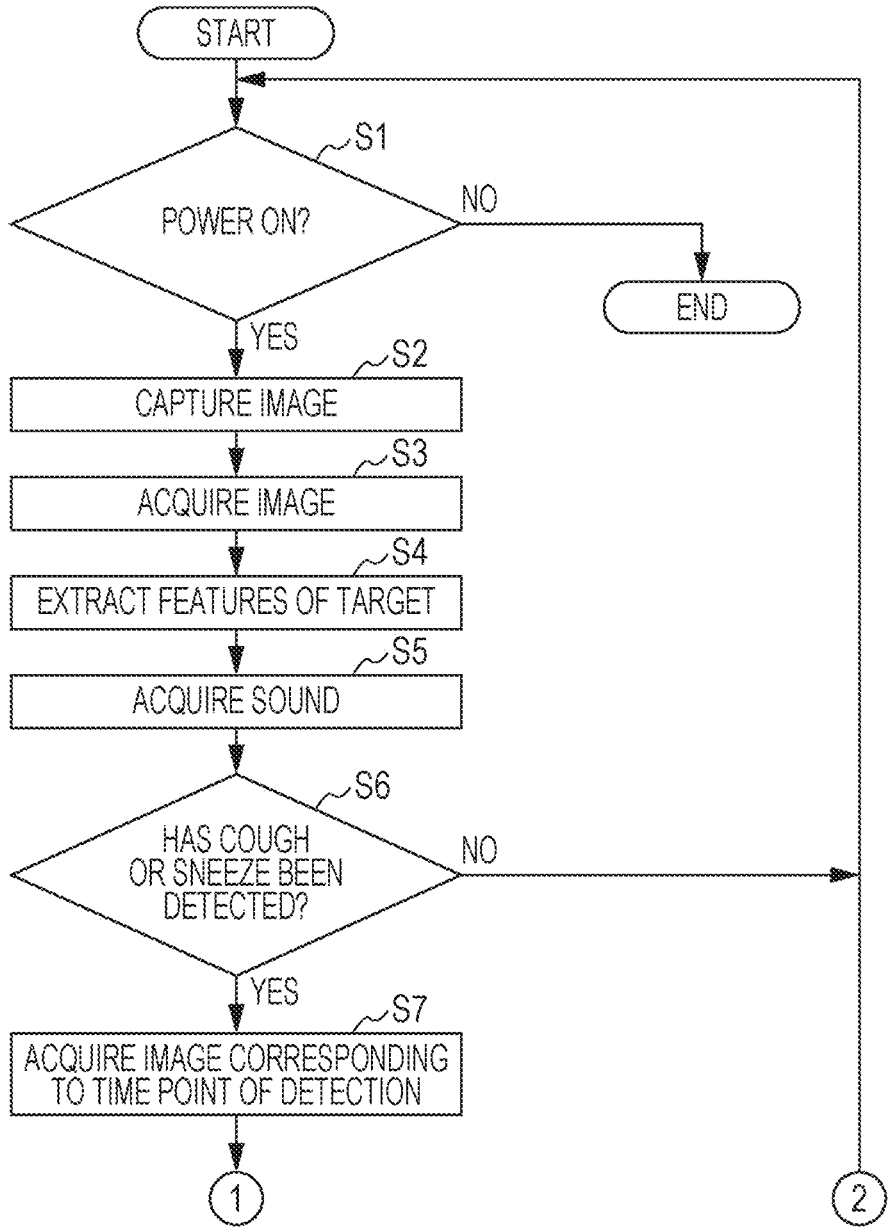
FIG. 12 is a first flowchart for describing the operation of an airflow control apparatus according to the first embodiment.
Figure 13:
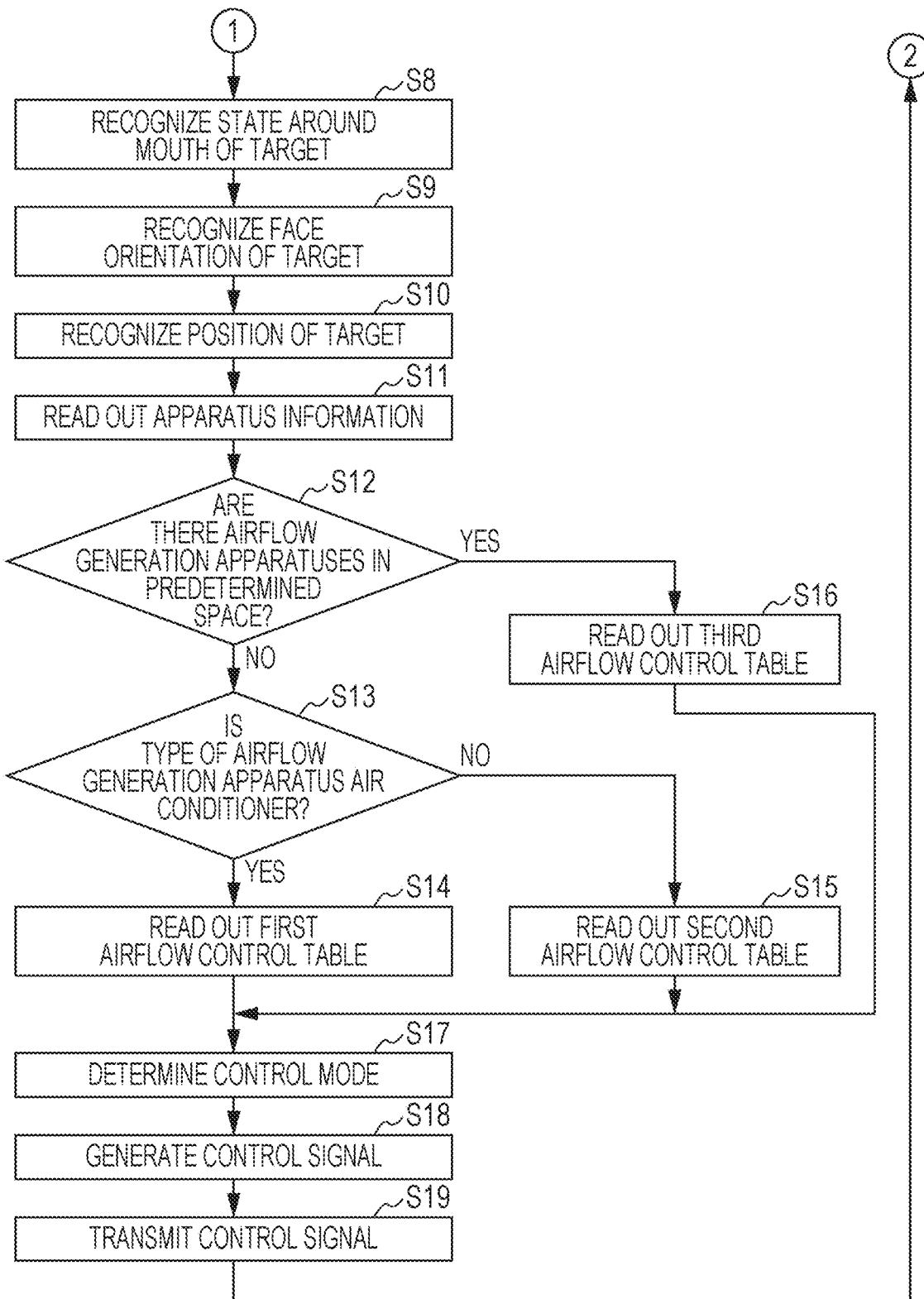
FIG. 13 is a second flowchart for describing the operation of the airflow control apparatus according to the first embodiment.

FIG. 12 is a first flowchart for describing the operation of the airflow control apparatus 1 according to the first embodiment, and FIG. 13 is a second flowchart for describing the operation of the airflow control apparatus 1 according to the first embodiment.

First, in step S1, the processor 13 determines whether or not the airflow control apparatus 1 is in a power-ON state. If it is determined that the airflow control apparatus 1 is in a power-OFF state (NO in step S1), the process ends.

On the other hand, if it is determined that the airflow control apparatus 1 is in a power-ON state (YES in step S1), the process proceeds to step S2, where the camera 11 captures an image of a predetermined space. The camera 11 stores the captured image in the image storage unit 141. Specifically, the camera 11 stores a moving image in the image storage unit 141.

Subsequently, in step S3, the image processing unit 131 acquires the image from the image storage unit 141.

Subsequently, in step S4, the image processing unit 131 extracts features of a target from the image. Here, the features of the target include, for example, the face, the eyes, the mouth, the right hand, the left hand, the clothes, and the mask of the target. In addition, the image processing unit 131 detects the center-of-gravity positions of the individual features.

Subsequently, in step S5, the cough/sneeze detection unit 132 acquires a sound from the microphone 12.

Subsequently, in step S6, the cough/sneeze detection unit 132 determines whether or not a cough or a sneeze of the target who is in the predetermined space has been detected. Here, the cough/sneeze detection unit 132 calculates a first distance between the center-of-gravity position of the face and the center-of-gravity position of the right hand extracted from the image, and also calculates a second distance between the center-of-gravity position of the face and the center-of-gravity position of the left hand extracted from the image. The cough/sneeze detection unit 132 determines whether or not the shorter one of the first distance and the second distance is smaller than or equal to a threshold value. If the cough/sneeze detection unit 132 determines that the shorter one of the first distance and the second distance is smaller than or equal to the threshold value, the cough/sneeze detection unit 132 determines whether or not the volume of the sound acquired from the microphone 12 is larger than or equal to a threshold value. If the cough/sneeze detection unit 132 determines that the shorter one of the first distance and the second distance is smaller than or equal to the threshold value and that the volume of the sound is larger than or equal to the threshold value, the cough/sneeze detection unit 132 determines that a cough or a sneeze of the target who is in the predetermined space has been detected. If the cough/sneeze detection unit 132 determines that the shorter one of the first distance and the second distance is larger than the threshold value or that the volume of the sound is smaller than the threshold value, the cough/sneeze detection unit 132 determines that a cough of the target who is in the predetermined space has not been detected and that a sneeze of the target who is in the predetermined space has not been detected.

If it is determined that a cough or a sneeze of the target who is in the predetermined space has not been detected (NO in step S6), the process returns to step S1.

On the other hand, if it is determined that a cough or a sneeze of the target who is in the predetermined space has been detected (YES in step S6), the process proceeds to step S7, where the person state determination unit 133 acquires, from the image storage unit 141, an image corresponding to the time point when the cough or the sneeze of the target who is in the predetermined space is detected.

Subsequently, in step S8, the person state determination unit 133 recognizes the state around the mouth of the target when the target coughed or sneezed. Here, the person state determination unit 133 recognizes, from the image corresponding to the time point when the cough or the sneeze of the target who is in the predetermined space is detected, whether the state around the mouth of the target is any one of a state in which the mouth of the person is not covered, a state in which the mouth of the person is covered with a hand, a state in which the mouth of the person is covered with a handkerchief, a state in which the mouth of the person is covered with a sleeve of a jacket, and a state in which the mouth of the person is covered with a mask.

The person state determination unit 133 may recognize the state around the mouth of the target from an image corresponding to a time before or after the time point when the cough or the sneeze is detected, in addition to the image corresponding to the time point when the cough or the sneeze is detected.

Subsequently, in step S9, the person state determination unit 133 recognizes, from the image corresponding to the time point when the cough or the sneeze of the target who is in the predetermined space is detected, the face orientation of the target when the target coughed or sneezed. At this time, the person state determination unit 133 determines which of a forward direction and a downward direction is the direction of the face of the target when the target coughed or sneezed.

Subsequently, in step S10, the person state determination unit 133 recognizes, from the image corresponding to the time point when the cough or the sneeze of the target who is in the predetermined space is detected, the position of the target in the predetermined space when the target coughed or sneezed.

Subsequently, in step S11, the control signal generation unit 134 reads out apparatus information from the apparatus information storage unit 142. The apparatus information includes type information indicating the type of the airflow generation apparatus 2 that is present in the predetermined space and position information indicating the position of the airflow generation apparatus 2 in the predetermined space. In a case where there are airflow generation apparatuses 2 in the predetermined space, the apparatus information includes pieces of type information indicating the types of the airflow generation apparatuses 2 in the predetermined space and pieces of position information indicating the positions of the airflow generation apparatuses 2 in the predetermined space.

Subsequently, in step S12, the control single generation unit 134 determines, on the basis of the apparatus information, whether or not there are airflow generation apparatuses in the predetermined space. If it is determined that there are not airflow generation apparatuses in the predetermined space, that is, if it is determined that there is one airflow generation apparatus in the predetermined space (NO in step S12), the process proceeds to step S13, where the control signal generation unit 134 determines whether or not the type of the airflow generation apparatus is an air conditioner.

If it is determined that the type of the airflow generation apparatus is an air conditioner (YES in step S13), the process proceeds to step S14, where the control signal generation unit 134 reads out, from the airflow control table storage unit 143, the first airflow control table that is to be used in a case where the airflow generation apparatus is one air conditioner.

On the other hand, if it is determined that the type of the airflow generation apparatus is not an air conditioner, that is, if it is determined that the type of the airflow generation apparatus is an air purifier (NO in step S13), the process proceeds to step S15, where the control signal generation unit 134 reads out, from the airflow control table storage unit 143, the second airflow control table that is to be used in a case where the airflow generation apparatus is one air purifier.

Furthermore, if it is determined in step S12 that there are airflow generation apparatuses in the predetermined space (YES in step S12), the process proceeds to step S16, where the control signal generation unit 134 reads out, from the airflow control table storage unit 143, the third airflow control table that is to be used in a case where the airflow generation apparatuses are one air conditioner and one air purifier.

Subsequently, in step S17, the control signal generation unit 134 refers to the first airflow control table, the second airflow control table, or the third airflow control table to determine a control mode corresponding to the state around the mouth of the target and the face orientation of the target recognized by the person state determination unit 133.

Subsequently, in step S18, the control signal generation unit 134 generates a control signal in accordance with the determined control mode. For example, in a case where the control mode for controlling the air direction so that air is sent to 1 m in front of the face is determined, the control signal generation unit 134 specifies a position 1 m in front of the face of the target, calculates an air direction from the position of the airflow generation apparatus 2 toward the specified position, and generates a control signal for sending air in the calculated air direction. In a case where the control mode for controlling the air direction so that air is sent toward the target is determined, the control signal generation unit 134 calculates an air direction from the position of the airflow generation apparatus 2 toward the position of the target and generates a control signal for sending air in the calculated air direction.

In a case where the control mode for controlling the air direction so that air is sent downward at 90 degrees is determined, the control signal generation unit 134 generates a control signal for sending air downward at 90 degrees. In a case where the control mode for changing the operation mode to a powerful operation mode is determined, the control signal generation unit 134 generates a control signal for changing the operation mode to the powerful operation mode.

In a case where the control mode for controlling the air direction so that air is sent to 1 m in front of the face from the airflow generation apparatus closest to the target is determined, the control signal generation unit 134 selects the airflow generation apparatus closest to the target from among the airflow generation apparatuses. At this time, the control signal generation unit 134 calculates the distances between the position of the target and the individual airflow generation apparatuses, and selects the airflow generation apparatus at the shortest distance as the airflow generation apparatus closest to the target. Subsequently, the control signal generation unit 134 specifies the position 1 meter in front of the face of the target, calculates an air direction from the position of the airflow generation apparatus closest to the target toward the specified position, and generates a control signal for sending air in the calculated air direction.

In a case where the control mode for controlling the air direction so that air is sent toward the target from the airflow generation apparatus closest to the target is determined, the control signal generation unit 134 selects the airflow generation apparatus closest to the target from among the airflow generation apparatuses. At this time, the control signal generation unit 134 calculates the distances between the position of the target and the individual airflow generation apparatuses, and selects the airflow generation apparatus at the shortest distance as the airflow generation apparatus closest to the target. Subsequently, the control signal generation unit 134 calculates an air direction from the position of the airflow generation apparatus closest to the target toward the position of the target, and generates a control signal for sending air in the calculated air direction.

In a case where the control mode for changing the operation mode of the airflow generation apparatus closest to the target to the powerful operation mode is determined, the control signal generation unit 134 selects the airflow generation apparatus closest to the target from among the airflow generation apparatuses. Subsequently, the control signal generation unit 134 generates a control signal for changing the operation mode of the airflow generation apparatus closest to the target to the powerful operation mode.

Subsequently, in step S19, the communication unit 15 transmits the control signal generated by the control signal generation unit 134 to the airflow generation apparatus 2. At this time, in a case where there are airflow generation apparatuses in the predetermined space, the communication unit 15 transmits the control signal to the airflow generation apparatus selected at the time of generating the control signal from among the airflow generation apparatuses.

The control signal may include a change duration indicating a period over which the airflow generation apparatus 2 is controlled in the changed control mode. The change duration is a period over which the airflow generation apparatus 2 is controlled with changed control parameters in accordance with the control signal. The same change duration may be used for all the control modes, or a change duration may be determined for each control mode by preparing a table in which the control modes are associated with respective change durations.

In the first embodiment, the person state determination unit 133 recognizes, from an image corresponding to the time point when the cough or the sneeze of the target who is in the predetermined space is detected, whether the state around the mouth of the target is any one of a state in which the mouth of the person is not covered, a state in which the mouth of the person is covered with a hand, a state in which the mouth of the person is covered with a handkerchief, a state in which the mouth of the person is covered with a sleeve of a jacket, and a state in which the mouth of the person is covered with a mask. The present disclosure is not particularly limited thereto. The person state determination unit 133 may recognize, from the image corresponding to the time point when the cough or the sneeze of the target who is in the predetermined space is detected, whether the state around the mouth of the target is any one of a state in which the mouth of the person is not covered and a state in which the mouth of the person is covered with a hand.

Alternatively, the person state determination unit 133 may recognize, from the image corresponding to the time point when the cough or the sneeze of the target who is in the predetermined space is detected, whether the state around the mouth of the target is any one of a state in which the mouth of the person is not covered, a state in which the mouth of the person is covered with a hand, and a state in which the mouth of the person is covered with a mask. Furthermore, the person state determination unit 133 may recognize, from the image corresponding to the time point when the cough or the sneeze of the target who is in the predetermined space is detected, whether the state around the mouth of the target is any one of a state in which the mouth of the person is not covered, a state in which the mouth of the person is covered with a hand, a state in which the mouth of the person is covered with a handkerchief, and a state in which the mouth of the person is covered with a mask.

Next, the operation of the airflow generation apparatus 2 according to the first embodiment will be described.

Figure 14:
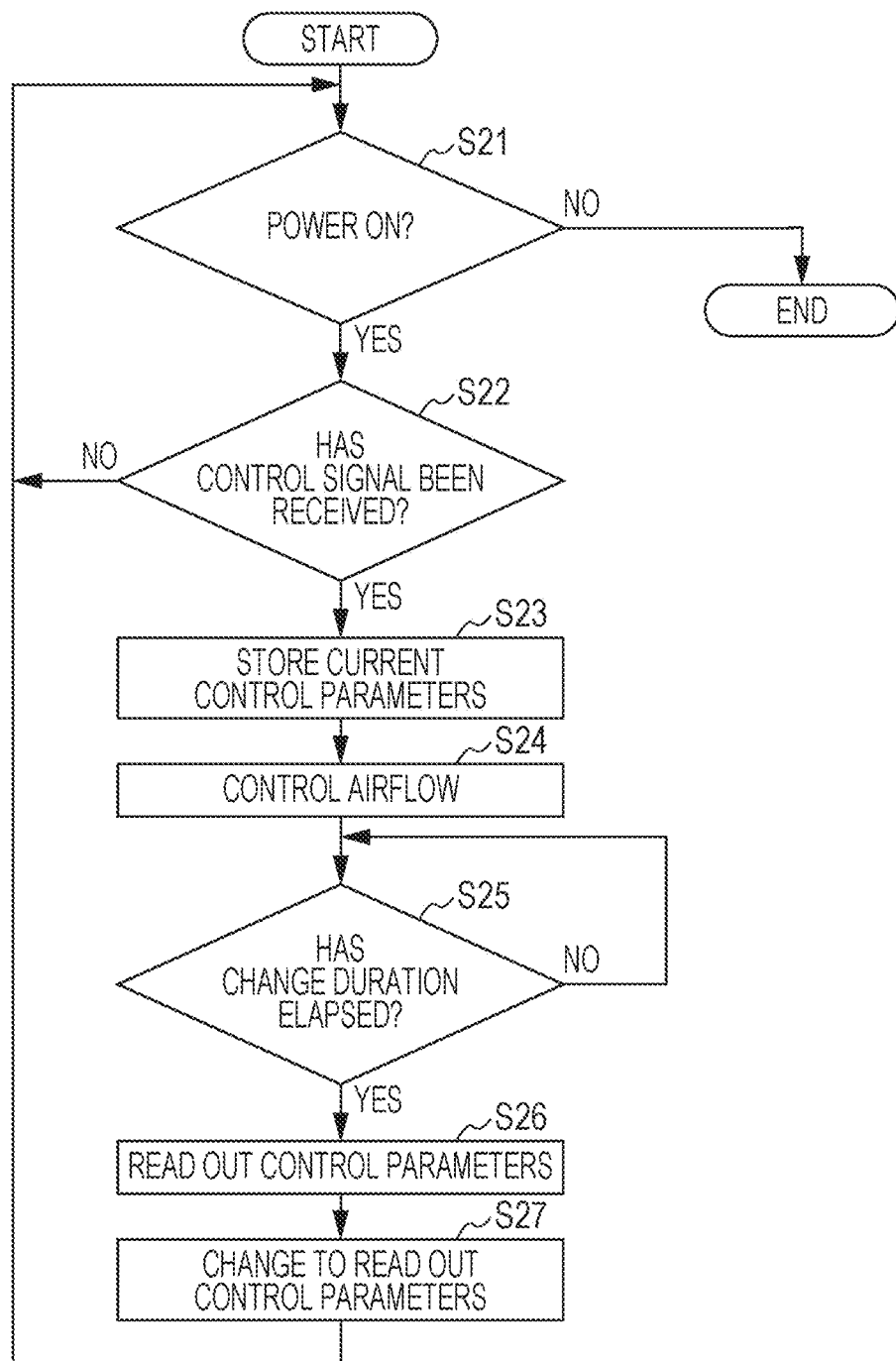
FIG. 14 is a flowchart for describing the operation of an airflow generation apparatus according to the first embodiment.

FIG. 14 is a flowchart for describing the operation of the airflow generation apparatus 2 according to the first embodiment.

First, in step S21, the processor 22 determines whether or not the airflow generation apparatus 2 is in a power-ON state. If it is determined that the airflow generation apparatus 2 is in a power-OFF state (NO in step S21), the process ends.

On the other hand, if it is determined that the airflow generation apparatus 2 is in a power-ON state (YES in step S21), the process proceeds to step S22, where the airflow control unit 221 determines whether or not a control signal has been received by the communication unit 21. If it is determined that a control signal has not been received (NO in step S22), the process returns to step S21.

On the other hand, if it is determined that a control signal has been received (YES in step S22), the process proceeds to step S23, where the airflow control unit 221 stores current control parameters in the memory 23. The control parameters include, for example, an operation mode, a set temperature, an air direction, an air volume, and so forth.

Subsequently, in step S24, the airflow control unit 221 controls the airflow to be generated by the airflow generation unit 24 on the basis of the control signal received by the communication unit 21. That is, the airflow control unit 221 instructs the airflow generation unit 24 to send air with the volume indicated by the control signal and instructs the air direction change unit 25 to change the air direction to the direction indicated by the control signal.

Subsequently, in step S25, the airflow control unit 221 determines whether or not the change duration included in the control signal has elapsed. If it is determined that the change duration has not elapsed (NO in step S25), the determination in step S25 is repeatedly performed.

On the other hand, if it is determined that the change duration has elapsed (YES in step S25), the process proceeds to step S26, where the airflow control unit 221 reads out the control parameters stored in the memory 23.

Subsequently, in step S27, the airflow control unit 221 changes the control parameters to the control parameters that have been read out.

In this way, from an image acquired when a cough or a sneeze of a person is detected in a predetermined space, the state around the mouth of the person when the person coughs or sneezes is recognized. On the basis of the recognized state around the mouth of the person, a control signal is generated for controlling at least one of the direction or volume of air that is to be sent from the airflow generation apparatus that generates an airflow in the predetermined space. Thus, as a result of generating an airflow at a place where droplets produced by a cough or a sneeze of the person localize, the localizing droplets can be dispersed to make the concentration uniform, and thus it is possible to reduce the risk of being infected with an infectious disease in the predetermined space where the cough or the sneeze has been detected.

Second Embodiment

In the first embodiment, the airflow control apparatus includes a camera and a microphone and detects a cough or a sneeze of a target on the basis of an image and a sound. In a second embodiment, the airflow control apparatus does not include a microphone but includes a camera, and detects a cough or a sneeze of a target on the basis of an image without using a sound.

Figure 15:
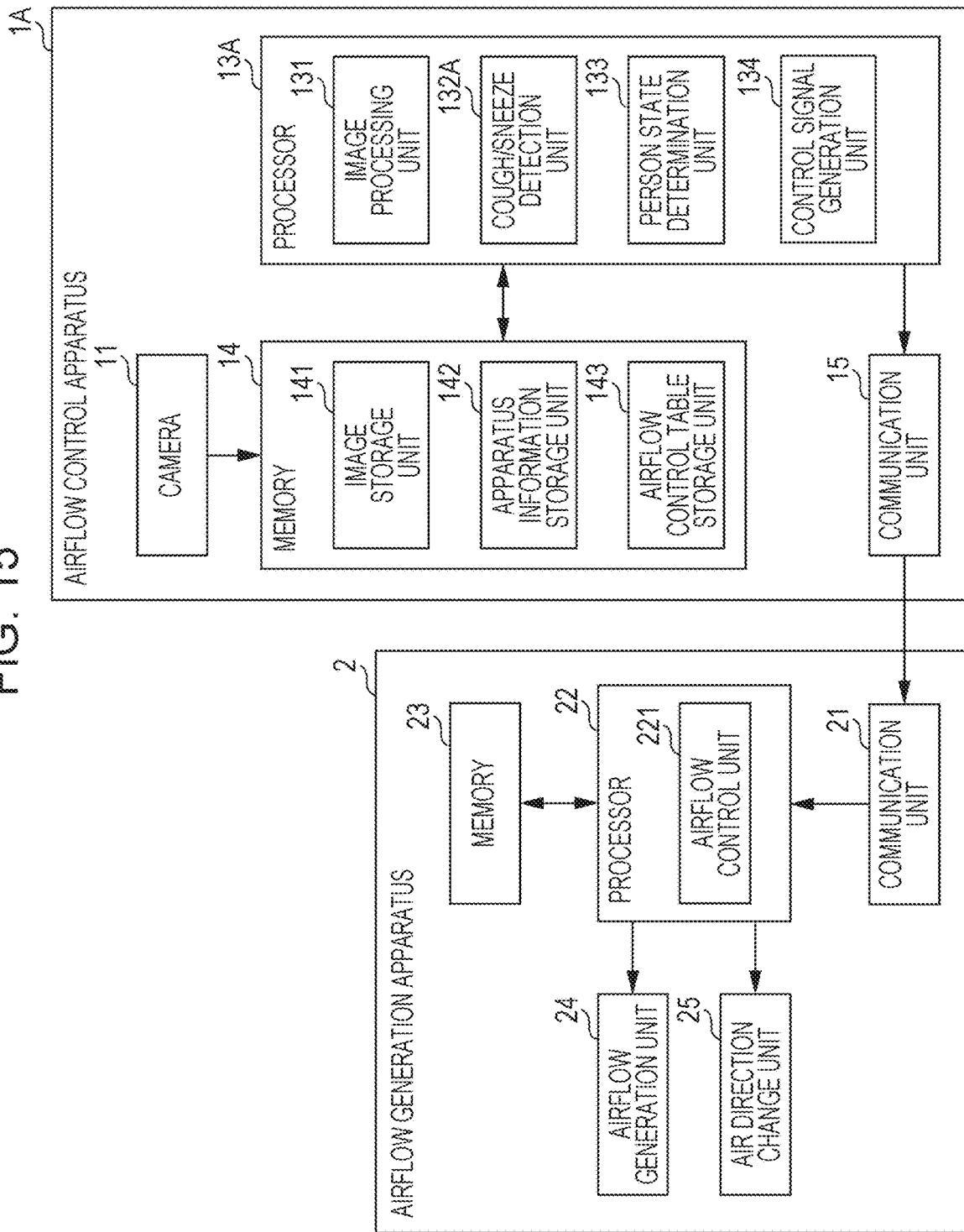
FIG. 15 is a diagram illustrating the configuration of an airflow control system according to a second embodiment of the present disclosure.

FIG. 15 is a diagram illustrating the configuration of an airflow control system according to the second embodiment of the present disclosure. The airflow control system illustrated in FIG. 15 includes an airflow control apparatus 1A and the airflow generation apparatus 2. In the second embodiment, the same components as those in the first embodiment are denoted by the same reference numerals, and the detailed description thereof is omitted.

The airflow control apparatus 1A controls an airflow in a predetermined space. The airflow control apparatus 1A is placed on a wall or a ceiling in the predetermined space. The airflow control apparatus 1A is connected to the airflow generation apparatus 2 via a network so as to be capable of communicating with each other.

The airflow control apparatus 1A includes the camera 11, a processor 13A, the memory 14, and the communication unit 15.

The processor 13A includes the image processing unit 131, a cough/sneeze detection unit 132A, the person state determination unit 133, and the control signal generation unit 134. The memory 14 is, for example, a semiconductor memory, and includes the image storage unit 141, the apparatus information storage unit 142, and the airflow control table storage unit 143.

The cough/sneeze detection unit 132A detects a cough or a sneeze of a person who is in the predetermined space. In the second embodiment, the cough/sneeze detection unit 132A detects at least one of a cough or a sneeze of a person who is in the predetermined space on the basis of an image without using a sound. The method for detecting at least one of a cough or a sneeze of a person who is in the predetermined space from an image is the same as in the first embodiment.

Specifically, the cough/sneeze detection unit 132A determines whether or not the distance between the position of the face of a person included in an image and the position of one hand of the person included in the image is smaller than or equal to a threshold value. If the cough/sneeze detection unit 132A determines that the distance is smaller than or equal to the threshold value, the cough/sneeze detection unit 132A detects at least one of a cough or a sneeze. More specifically, the cough/sneeze detection unit 132A calculates a first distance between the center-of-gravity position of the face and the center-of-gravity position of the right hand extracted from the image, and also calculates a second distance between the center-of-gravity position of the face and the center-of-gravity position of the left hand extracted from the image. The cough/sneeze detection unit 132A determines whether or not the shorter one of the first distance and the second distance is smaller than or equal to the threshold value. If the cough/sneeze detection unit 132A determines that the shorter one of the first distance and the second distance is smaller than or equal to the threshold value, the cough/sneeze detection unit 132A determines that a cough or a sneeze of the target who is in the predetermined space has been detected. If the cough/sneeze detection unit 132A determines that the shorter one of the first distance and the second distance is larger than the threshold value, the cough/sneeze detection unit 132A determines that a cough of the target who is in the predetermined space has not been detected and that a sneeze of the target who is in the predetermined space has not been detected.

The cough/sneeze detection unit 132A may determine whether or not the area of the mouth of a person included in an image is smaller than or equal to a threshold value. If the cough/sneeze detection unit 132A determines that the area is smaller than or equal to the threshold value, the cough/sneeze detection unit 132A may detect a cough or a sneeze.

Next, the operation of the airflow control apparatus 1A according to the second embodiment will be described.

Figure 16:
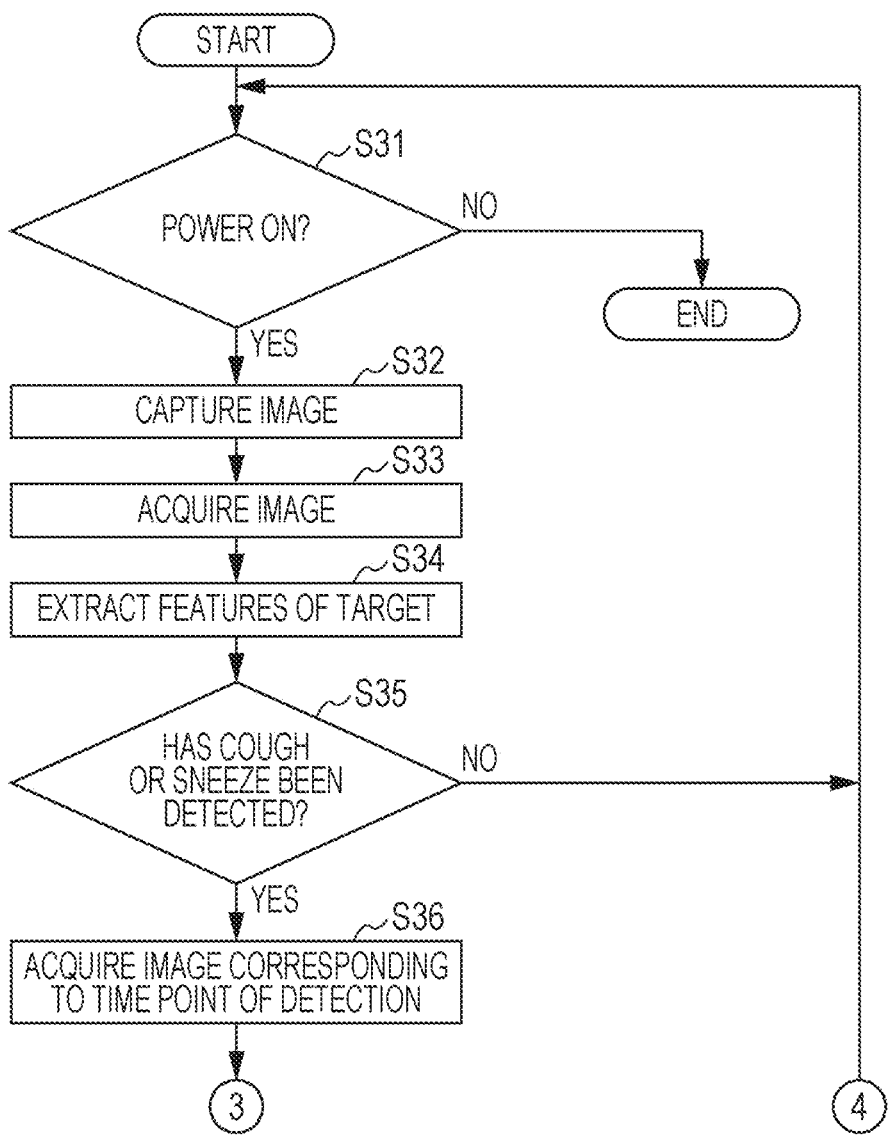
FIG. 16 is a first flowchart for describing the operation of an airflow control apparatus according to the second embodiment.
Figure 17:
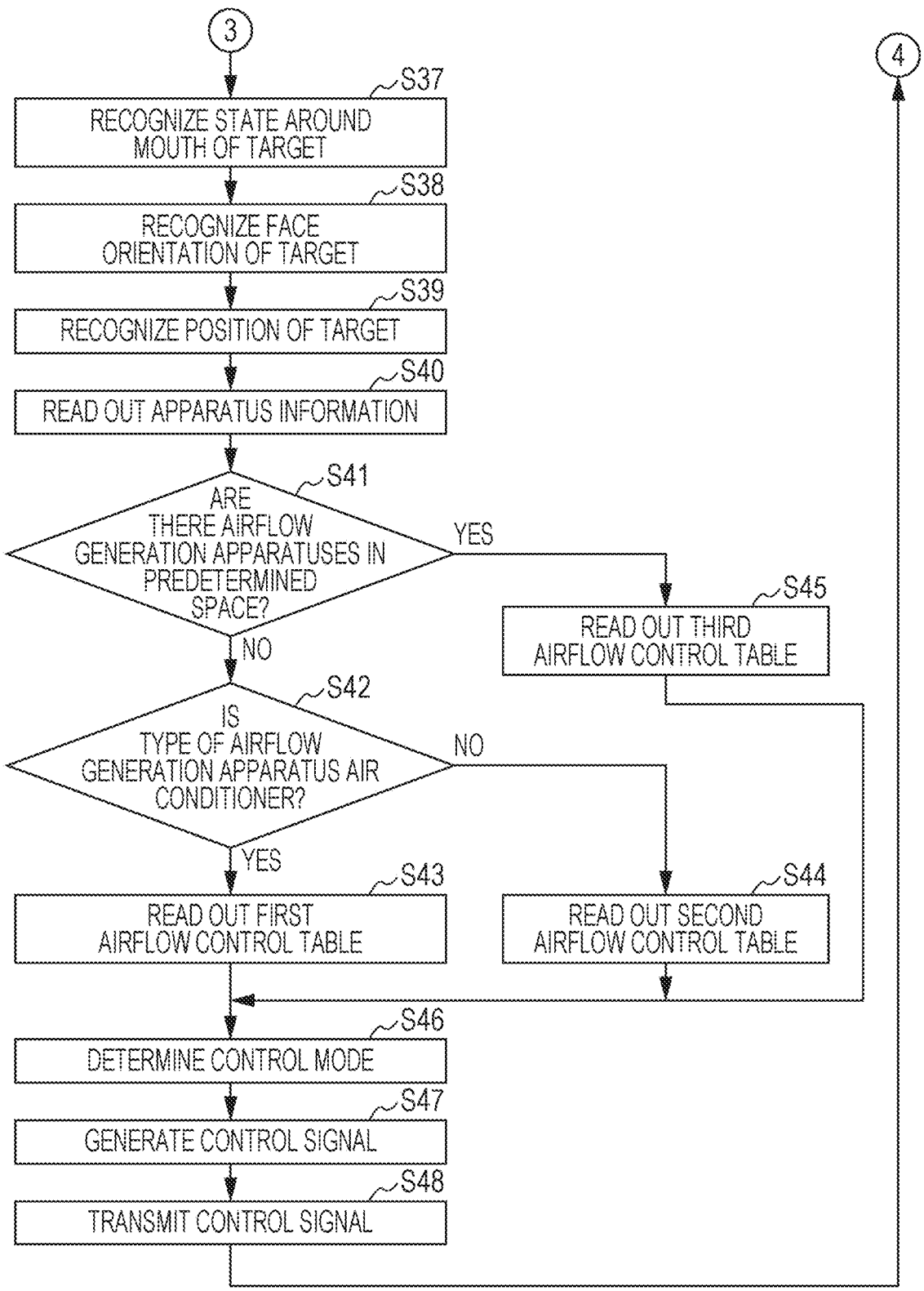
FIG. 17 is a second flowchart for describing the operation of the airflow control apparatus according to the second embodiment.

FIG. 16 is a first flowchart for describing the operation of the airflow control apparatus 1A according to the second embodiment, and FIG. 17 is a second flowchart for describing the operation of the airflow control apparatus 1A according to the second embodiment.

Steps S31 to S34 illustrated in FIG. 16 are the same as steps S1 to S4 illustrated in FIG. 12, and thus the detailed description thereof is omitted.

In step S35, the cough/sneeze detection unit 132A determines whether or not a cough or a sneeze of the target who is in the predetermined space has been detected. Here, the cough/sneeze detection unit 132A calculates a first distance between the center-of-gravity position of the face and the center-of-gravity position of the right hand extracted from the image, and also calculates a second distance between the center-of-gravity position of the face and the center-of-gravity position of the left hand extracted from the image. The cough/sneeze detection unit 132A determines whether or not the shorter one of the first distance and the second distance is smaller than or equal to a threshold value. If the cough/sneeze detection unit 132A determines that the shorter one of the first distance and the second distance is smaller than or equal to the threshold value, the cough/sneeze detection unit 132A determines that a cough or a sneeze of the target who is in the predetermined space has been detected. If the cough/sneeze detection unit 132A determines that the shorter one of the first distance and the second distance is larger than the threshold value, the cough/sneeze detection unit 132A determines that a cough of the target who is in the predetermined space has not been detected and that a sneeze of the target who is in the predetermined space has not been detected.

If it is determined that a cough of the target who is in the predetermined space has not been detected and that a sneeze of the target who is in the predetermined space has not been detected (NO in step S35), the process returns to step S31.

On the other hand, if it is determined that a cough or a sneeze of the target who is in the predetermined space has been detected (YES in step S35), the process proceeds to step S36, where the person state determination unit 133 acquires, from the image storage unit 141, an image corresponding to the time point when the cough or the sneeze of the target who is in the predetermined space is detected.

Steps S37 to S48 illustrated in FIG. 17 are the same as steps S8 to S19 illustrated in FIG. 13, and thus the detailed description thereof is omitted.

In this way, with use of an image acquired from the camera 11 that captures an image of a predetermined space, it can be detected that a person in the predetermined space has coughed or sneezed. Accordingly, the configuration of the airflow control apparatus 1A can be more simplified and the cost of the airflow control apparatus 1A can be reduced.

Third Embodiment

In the first embodiment, the airflow control apparatus includes a camera and a microphone. In a third embodiment, the airflow control apparatus includes neither a camera nor a microphone, and is connected to a camera and a microphone so as to be capable of communicating with each other.

Figure 18:
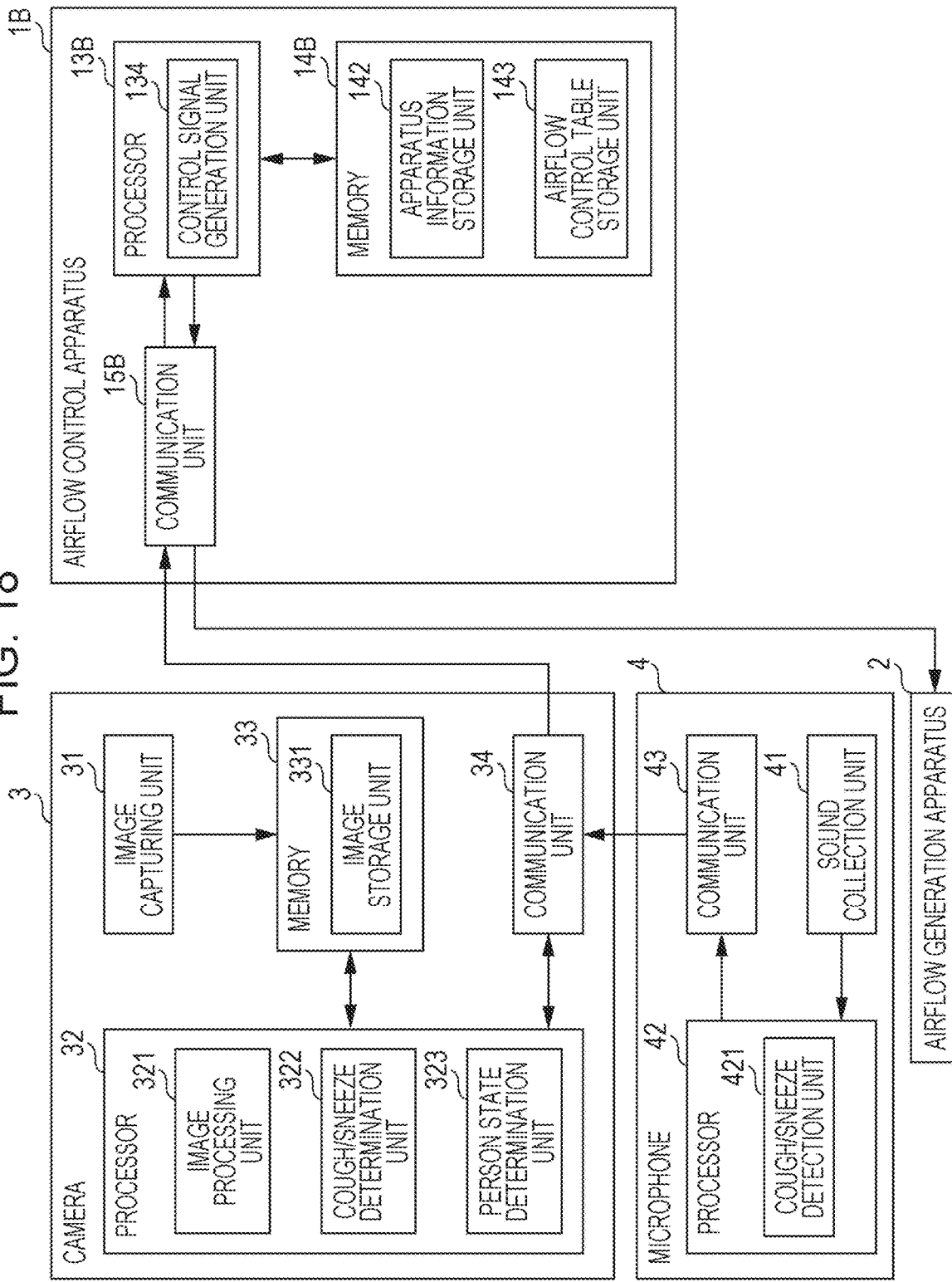
FIG. 18 is a diagram illustrating the configuration of an airflow control system according to a third embodiment of the present disclosure.

FIG. 18 is a diagram illustrating the configuration of an airflow control system according to the third embodiment of the present disclosure. The airflow control system illustrated in FIG. 18 includes an airflow control apparatus 1B, the airflow generation apparatus 2, a camera 3, and a microphone 4. In the third embodiment, the same components as those in the first embodiment are denoted by the same reference numerals, and the detailed description thereof is omitted.

The microphone 4 is installed in a predetermined space. The microphone 4 is connected to the camera 3 via a network so as to be capable of communicating with each other. The microphone 4 includes a sound collection unit 41, a processor 42, and a communication unit 43.

The sound collection unit 41 collects a sound in the predetermined space and outputs the collected sound to the processor 42.

The processor 42 includes a cough/sneeze detection unit 421. The cough/sneeze detection unit 421 detects a cough or a sneeze of a person who is in the predetermined space. The cough/sneeze detection unit 421 detects that a person has coughed or sneezed in an indoor space. The cough/sneeze detection unit 421 detects a cough or a sneeze of a person who is in the predetermined space by using a sound collected by the microphone 4.

For example, the cough/sneeze detection unit 421 determines whether or not the volume of a sound collected by the sound collection unit 41 is larger than or equal to a threshold value. If the cough/sneeze detection unit 421 determines that the volume of the sound collected by the sound collection unit 41 is larger than or equal to the threshold value, the cough/sneeze detection unit 421 determines that a person who is in the predetermined space has coughed or sneezed. As the threshold value, for example, 70 dB may be used.

The cough/sneeze detection unit 421 may perform spectrum analysis on the sound collected by the sound collection unit 41 and may detect a cough or a sneeze by using an algorithm of machine learning or the like on the basis of a result of the analysis. In this case, a cough or a sneeze can be detected by using a spectrum pattern specific to a cough or a sneeze, and thus detection accuracy increases.

In a case where a cough or a sneeze of a person has been detected in the predetermined space by the cough/sneeze detection unit 421, the communication unit 43 transmits to the camera 3 a cough/sneeze detection signal indicating that the cough or the sneeze of the person has been detected in the predetermined space.

The camera 3 is installed on a ceiling or a wall in the predetermined space. The camera 3 is connected to the airflow control apparatus 1B and the microphone 4 via a network so as to be capable of communicating with each other. The camera 3 includes an image capturing unit 31, a processor 32, a memory 33, and a communication unit 34.

The image capturing unit 31 is, for example, an image capturing device. The image capturing unit 31 captures an image of the predetermined space and outputs the captured image to the memory 33.

The processor 32 includes an image processing unit 321, a cough/sneeze determination unit 322, and a person state determination unit 323.

The memory 33 is, for example, a semiconductor memory, and includes an image storage unit 331. The image storage unit 331 stores an image captured by the image capturing unit 31. The image capturing unit 31 captures an image of the predetermined space and stores the image in the image storage unit 331.

The image processing unit 321 acquires the image of the predetermined space from the image storage unit 331. The image processing unit 321 performs image processing on the acquired image and extracts features of a target, such as the face, nose, mouth, hands, and clothes of the target, whether or not the target is wearing a mask, and the position of the target in the room. The image processing unit 321 may use machine learning or deep learning to extract the features, and may use a widely used feature extractor, such as a Haar-Like feature extractor, to detect the face and the like.

The function of the image processing unit 321 is the same as the function of the image processing unit 131 according to the first embodiment.

The communication unit 34 receives a cough/sneeze detection signal transmitted by the microphone 4.

In response to receipt of the cough/sneeze detection signal by the communication unit 34, the cough/sneeze determination unit 322 determines that a cough or a sneeze of a person has been detected in the predetermined space.

The person state determination unit 323 recognizes, from an image acquired when the cough or the sneeze of the person is detected, the state around the mouth of the person when the person coughed or sneezed.

The person state determination unit 323 recognizes the state around the mouth of the target from an image corresponding to a time before or after the time point when the cough or the sneeze is detected. The state around the mouth of a person can be classified into one of patterns. For example, the state around the mouth of a person includes a state in which the mouth of the person is not covered, a state in which the mouth of the person is covered with a hand, a state in which the mouth of the person is covered with a handkerchief, a state in which the mouth of the person is covered with a sleeve of a jacket, and a state in which the mouth of the person is covered with a mask.

The person state determination unit 323 recognizes any one of a state in which the mouth of the person is not covered, a state in which the mouth of the person is covered with a hand, a state in which the mouth of the person is covered with a handkerchief, a state in which the mouth of the person is covered with a sleeve of a jacket, and a state in which the mouth of the person is covered with a mask.

In addition, the person state determination unit 323 recognizes, from the image acquired when the cough or the sneeze of the person is detected, the face orientation of the person when the person coughed or sneezed.

In addition, the person state determination unit 323 recognizes, from the image acquired when the cough or the sneeze of the person is detected, the position of the person in the predetermined space when the person coughed or sneezed.

The function of the person state determination unit 323 is the same as the function of the person state determination unit 133 according to the first embodiment.

The communication unit 34 transmits to the airflow control apparatus 1B state information indicating the state around the mouth of the person, the face orientation of the person, and the position of the person in the predetermined space recognized by the person state determination unit 323.

The airflow control apparatus 1B controls an airflow in the predetermined space. The place where the airflow control apparatus 1B is placed is not particularly limited. The airflow control apparatus 1B may be, for example, a server. The airflow control apparatus 1B is connected to the airflow generation apparatus 2 and the camera 3 via a network so as to be capable of communicating with each other.

The airflow control apparatus 1B includes a processor 13B, a memory 14B, and a communication unit 15B.

The processor 13B includes the control signal generation unit 134. The memory 14B is, for example, a semiconductor memory, and includes the apparatus information storage unit 142 and the airflow control table storage unit 143.

The communication unit 15B receives state information transmitted by the camera 3. The communication unit 15B transmits a control signal to the airflow generation apparatus 2.

The control signal generation unit 134 generates a control signal for controlling at least one of the direction or volume of air that is to be sent from the airflow generation apparatus 2 that generates an airflow in the predetermined space, on the basis of the state around the mouth of the person included in the state information received by the communication unit 15B. The control signal generation unit 134 causes the direction of the air to be sent from the airflow generation apparatus 2 to be different between a case where the face of the person is oriented forward and a case where the face of the person is oriented downward. Furthermore, the control signal generation unit 134 generates a control signal on the basis of the state around the mouth of the person included in the state information received by the communication unit 15B and the position coordinates included in the state information received by the communication unit 15B.

The control signal generation unit 134 acquires, from the airflow control table stored in the airflow control table storage unit 143, a control mode corresponding to the state around the mouth of the person and the face orientation of the person included in the state information received by the communication unit 15B, and generates a control signal for controlling the airflow generation apparatus 2 in the acquired control mode.

The control signal generation unit 134 outputs the generated control signal to the communication unit 15B. The communication unit 15B transmits the control signal generated by the control signal generation unit 134 to the airflow generation apparatus 2.

Next, the operations of the airflow control apparatus 1B and the camera 3 according to the third embodiment will be described.

Figure 19:
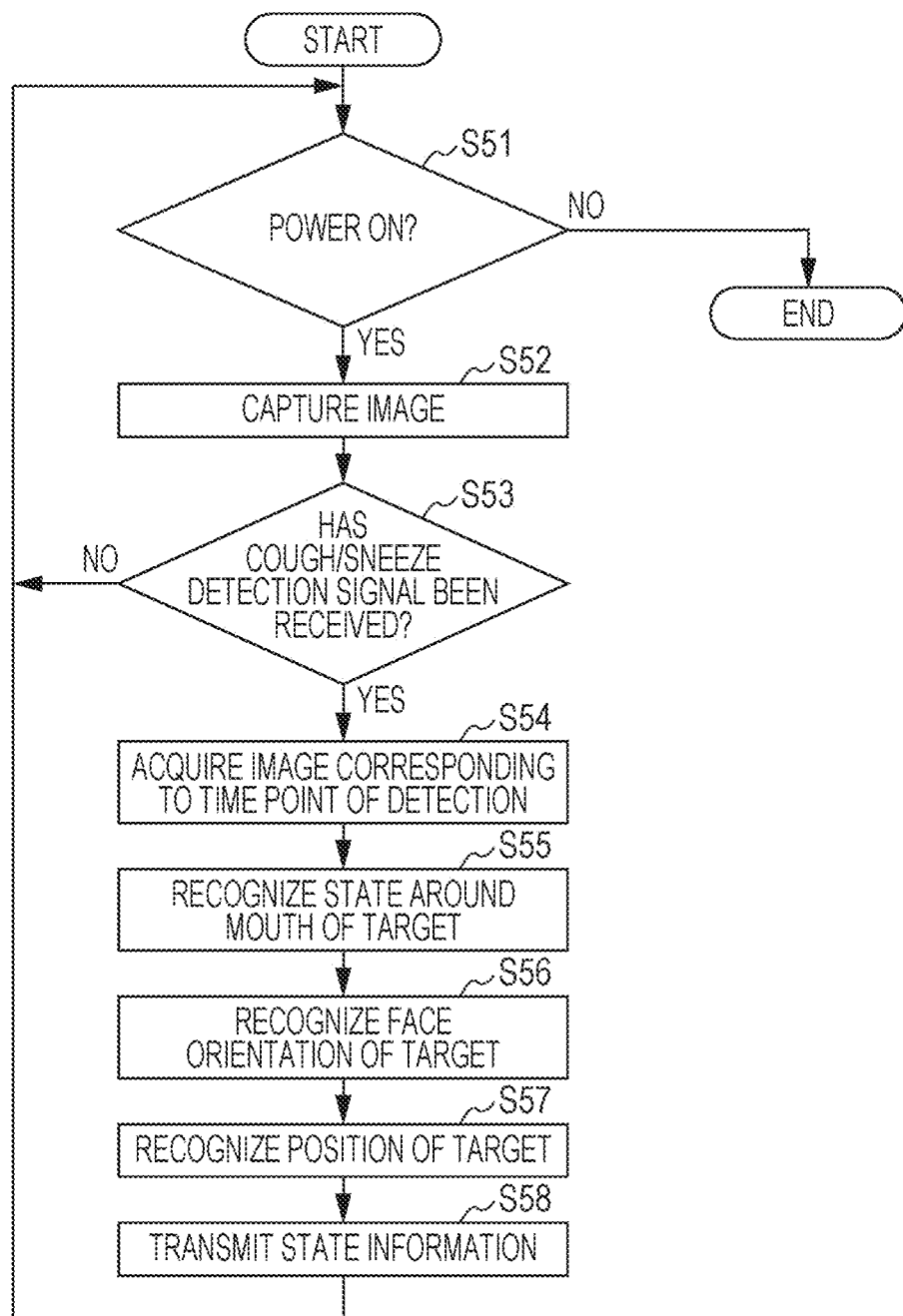
FIG. 19 is a flowchart for describing the operation of a camera according to the third embodiment.

FIG. 19 is a flowchart for describing the operation of the camera 3 according to the third embodiment.

First, in step S51, the processor 32 determines whether or not the camera 3 is in a power-ON state. If it is determined that the camera 3 is in a power-OFF state (NO in step S51), the process ends.

On the other hand, if it is determined that the camera 3 is in a power-ON state (YES in step S51), the process proceeds to step S52, where the image capturing unit 31 captures an image of a predetermined space. The image capturing unit 31 stores the captured image in the image storage unit 331. The image capturing unit 31 stores a moving image in the image storage unit 331.

Subsequently, in step S53, the cough/sneeze determination unit 322 determines whether or not a cough/sneeze detection signal has been received by the communication unit 34. The cough/sneeze detection signal is transmitted by the microphone 4. If it is determined that a cough/sneeze detection signal has not been received (NO in step S53), the process returns to step S51.

On the other hand, if it is determined that a cough/sneeze detection signal has been received (YES in step S53), the process proceeds to step S54, where the person state determination unit 323 acquires, from the image storage unit 331, an image corresponding to the time point when the cough or the sneeze of the target in the predetermined space is detected. The cough/sneeze detection signal includes the time at which the cough or the sneeze of the person is detected in the predetermined space. The image includes the time at which the image is captured. The person state determination unit 323 acquires, from the image storage unit 331, an image captured at the time included in the cough-sneeze detection signal.

Subsequently, in step S55, the person state determination unit 323 recognizes the state around the mouth of the target when the target coughed or sneezed. Step S55 illustrated in FIG. 19 is the same as step S8 illustrated in FIG. 13.

Subsequently, in step S56, the person state determination unit 323 recognizes, from the image corresponding to the time point when the cough or the sneeze of the target in the predetermined space is detected, the face orientation of the target when the target coughed or sneezed. Step S56 illustrated in FIG. 19 is the same as step S9 illustrated in FIG. 13.

Subsequently, in step S57, the person state determination unit 323 recognizes, from the image corresponding to the time point when the cough or the sneeze of the target in the predetermined space is detected, the position of the target in the predetermined space when the target coughed or sneezed. Step S57 illustrated in FIG. 19 is the same as step S10 illustrated in FIG. 13.

Subsequently, in step S58, the communication unit 34 transmits to the airflow control apparatus 1B state information indicating the state around the mouth of the target, the face orientation of the target, and the position of the target in the predetermined space recognized by the person state determination unit 323.

Figure 20:
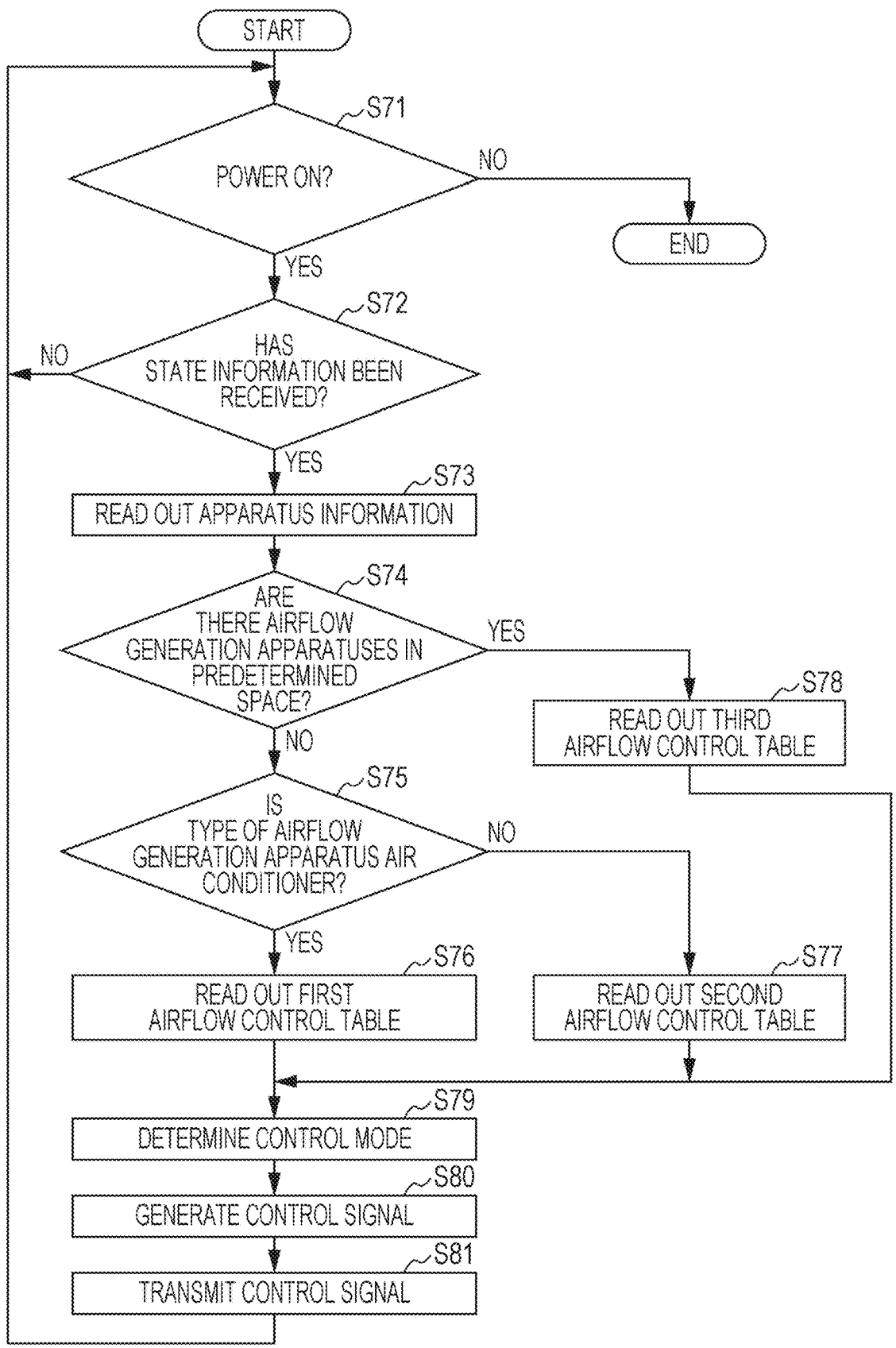
FIG. 20 is a flowchart for describing the operation of an airflow control apparatus according to the third embodiment.

FIG. 20 is a flowchart for describing the operation of the airflow control apparatus 1B according to the third embodiment.

First, in step S71, the processor 13B determines whether or not the airflow control apparatus 1B is in a power-ON state. If it is determined that the airflow control apparatus 1B is in a power-OFF state (NO in step S71), the process ends.

On the other hand, if it is determined that the airflow control apparatus 1B is in a power-ON state (YES in step S71), the process proceeds to step S72, where the control signal generation unit 134 determines whether or not state information has been received by the communication unit 15B. The state information is transmitted by the camera 3. If it is determined that state information has not been received (NO in step S72), the process returns to step S71.

On the other hand, if it is determined that state information has been received (YES in step S72), the process proceeds to step S73, where the control signal generation unit 134 reads out apparatus information from the apparatus information storage unit 142.

Steps S74 to S81 illustrated in FIG. 20 are the same as steps S12 to S19 illustrated in FIG. 13.

In this way, the microphone 4 detects that a person in the predetermined space has coughed or sneezed, the camera 3 recognizes the state around the mouth of the target, the face orientation of the target, and the position of the target in the predetermined space when the target coughed or sneezed, and the airflow control apparatus 1B generates a control signal for controlling an airflow in the predetermined space. Thus, the configuration of the airflow control apparatus 1B can be more simplified, and the processing load of the airflow control apparatus 1B can be reduced.

In the third embodiment, when a cough/sneeze detection signal is received by the communication unit 34, the cough/sneeze determination unit 322 determines that a cough or a sneeze of a person has been detected in the predetermined space, but the present disclosure is not particularly limited thereto. The cough/sneeze determination unit 322 may determine, from an image and a cough/sneeze detection signal, whether or not a cough or a sneeze of a person has been detected in the predetermined space. For example, the cough/sneeze determination unit 322 may determine that a target has coughed or sneezed when a cough/sneeze detection signal is received by the communication unit 34 and it is determined that the distance between the position of the face of the person included in an image captured by the image capturing unit 31 and the position of one hand of the person included in the image is smaller than or equal to a threshold value.

Fourth Embodiment

In the third embodiment, the airflow control system includes a microphone and detects a cough or a sneeze of a target on the basis of a sound. In a fourth embodiment, the airflow control system does not include a microphone and detects a cough or a sneeze of a target on the basis of an image.

Figure 21:
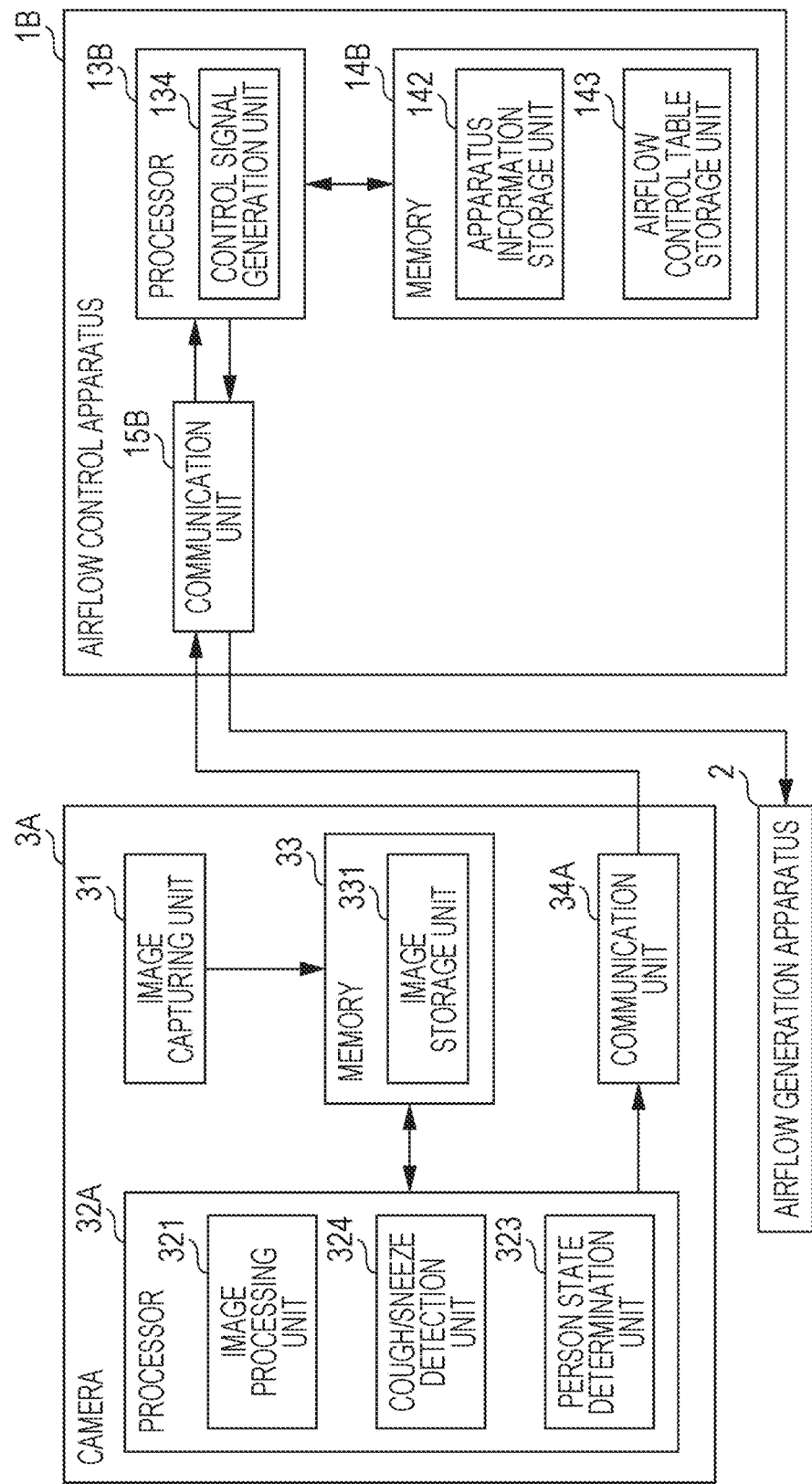
FIG. 21 is a diagram illustrating the configuration of an airflow control system according to a fourth embodiment of the present disclosure.

FIG. 21 is a diagram illustrating the configuration of an airflow control system according to the fourth embodiment of the present disclosure. The airflow control system illustrated in FIG. 21 includes the airflow control apparatus 1B, the airflow generation apparatus 2, and a camera 3A. In the fourth embodiment, the same components as those in the third embodiment are denoted by the same reference numerals, and the detailed description thereof is omitted.

The camera 3A is installed on a ceiling or a wall in a predetermined space. The camera 3A is connected to the airflow control apparatus 1B via a network so as to be capable of communicating with each other. The camera 3A includes the image capturing unit 31, a processor 32A, the memory 33, and a communication unit 34A.

The processor 32A includes the image processing unit 321, the person state determination unit 323, and a cough/sneeze detection unit 324.

The cough/sneeze detection unit 324 detects a cough or a sneeze of a person who is in the predetermined space. In the fourth embodiment, the cough/sneeze detection unit 324 detects a cough or a sneeze of a person who is in the predetermined space on the basis of an image. The method for detecting a cough or a sneeze of a person who is in the predetermined space from an image is the same as in the first embodiment.

Specifically, the cough/sneeze detection unit 324 determines whether or not the distance between the position of the face of a person included in an image and the position of one hand of the person included in the image is smaller than or equal to a threshold value. If the cough/sneeze detection unit 324 determines that the distance is smaller than or equal to the threshold value, the cough/sneeze detection unit 324 detects a cough or a sneeze. More specifically, the cough/sneeze detection unit 324 calculates a first distance between the center-of-gravity position of the face and the center-of-gravity position of the right hand extracted from the image, and also calculates a second distance between the center-of-gravity position of the face and the center-of-gravity position of the left hand extracted from the image. The cough/sneeze detection unit 324 determines whether or not the shorter one of the first distance and the second distance is smaller than or equal to the threshold value. If the cough/sneeze detection unit 324 determines that the shorter one of the first distance and the second distance is smaller than or equal to the threshold value, the cough/sneeze detection unit 324 determines that a cough or a sneeze of the target who is in the predetermined space has been detected. If the cough/sneeze detection unit 324 determines that the shorter one of the first distance and the second distance is larger than the threshold value, the cough/sneeze detection unit 324 determines that a cough of the target who is in the predetermined space has not been detected and that a sneeze of the target who is in the predetermined space has not been detected.

The cough/sneeze detection unit 324 may determine whether or not the area of the mouth of a person included in an image is smaller than or equal to a threshold value. If the cough/sneeze detection unit 324 determines that the area is smaller than or equal to the threshold value, the cough/sneeze detection unit 324 may detect a cough or a sneeze.

The communication unit 34A transmits to the airflow control apparatus 1B state information indicating the state around the mouth of the person, the face orientation of the person, and the position of the person in the predetermined space recognized by the person state determination unit 323.

Next, the operation of the camera 3A according to the fourth embodiment will be described.

Figure 22:
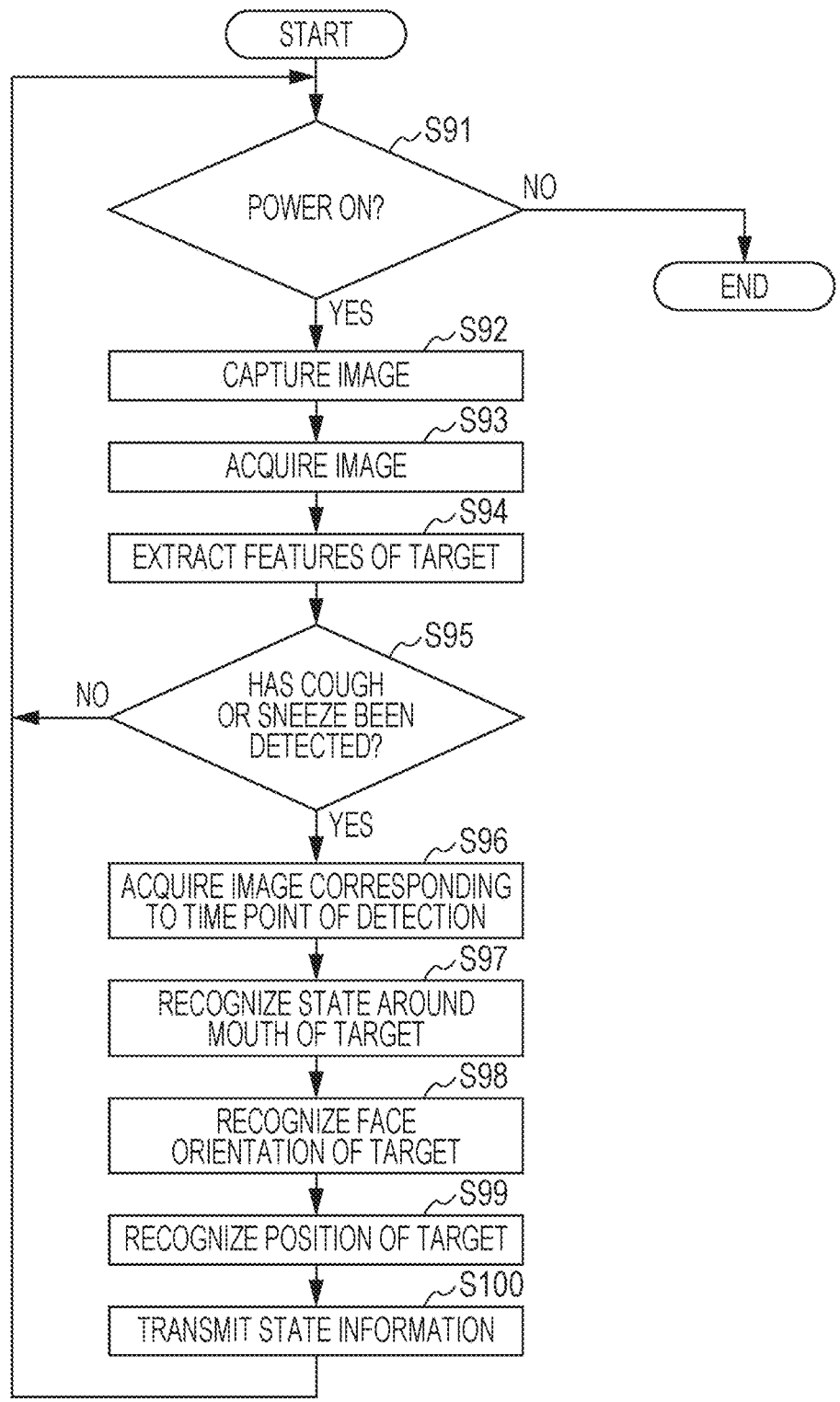
FIG. 22 is a flowchart for describing the operation of a camera according to the fourth embodiment.

FIG. 22 is a flowchart for describing the operation of the camera 3A according to the fourth embodiment.

First, in step S91, the processor 32A determines whether or not the camera 3A is in a power-ON state. If it is determined that the camera 3A is in a power-OFF state (NO in step S91), the process ends.

On the other hand, if it is determined that the camera 3A is in a power-ON state (YES in step S91), the process proceeds to step S92, where the image capturing unit 31 captures an image of a predetermined space. The image capturing unit 31 stores the captured image in the image storage unit 331. The image capturing unit 31 stores a moving image in the image storage unit 331.

Subsequently, in step S93, the image processing unit 321 acquires the image from the image storage unit 331.

Subsequently, in step S94, the image processing unit 321 extracts features of a target from the image. Here, the features of the target include, for example, the face, the eyes, the mouth, the right hand, the left hand, the clothes, and the mask of the target. In addition, the image processing unit 321 detects the center-of-gravity positions of the individual features.

Subsequently, in step S95, the cough/sneeze detection unit 324 determines whether or not a cough or a sneeze of the target who is in the predetermined space has been detected. Here, the cough/sneeze detection unit 324 calculates a first distance between the center-of-gravity position of the face and the center-of-gravity position of the right hand extracted from the image, and also calculates a second distance between the center-of-gravity position of the face and the center-of-gravity position of the left hand extracted from the image. The cough/sneeze detection unit 324 determines whether or not the shorter one of the first distance and the second distance is smaller than or equal to a threshold value. If the cough/sneeze detection unit 324 determines that the shorter one of the first distance and the second distance is smaller than or equal to the threshold value, the cough/sneeze detection unit 324 determines that a cough or a sneeze of the target who is in the predetermined space has been detected. If the cough/sneeze detection unit 324 determines that the shorter one of the first distance and the second distance is larger than the threshold value, the cough/sneeze detection unit 324 determines that a cough of the target who is in the predetermined space has not been detected and that a sneeze of the target who is in the predetermined space has not been detected.

If it is determined that a cough or a sneeze of the target who is in the predetermined space has not been detected (NO in step S95), the process returns to step S91.

On the other hand, if it is determined that a cough or a sneeze of the target who is in the predetermined space has been detected (YES in step S95), the process proceeds to step S96, where the person state determination unit 323 acquires, from the image storage unit 331, an image corresponding to the time point when the cough or the sneeze of the target who is in the predetermined space is detected.

Steps S97 to S100 illustrated in FIG. 22 are the same as steps S55 to S58 illustrated in FIG. 19, and thus the detailed description thereof is omitted.

In this way, the camera 3A detects that a person in a predetermined space has coughed or sneezed and recognizes the state around the mouth of the target, the face orientation of the target, and the position of the target in the predetermined space when the target coughed or sneezed, and the airflow control apparatus 1B generates a control signal for controlling an airflow in the predetermined space. Thus, the configuration of the airflow control system can be more simplified, and the cost of the airflow control system can be reduced.

Infection Risk Evaluation System

The present disclosure includes an infection risk evaluation system described below. In the description of the infection risk evaluation system, the components substantially the same as those of the above-described airflow control system are denoted by the same reference numerals, and the detailed description thereof is omitted.

Figure 23:
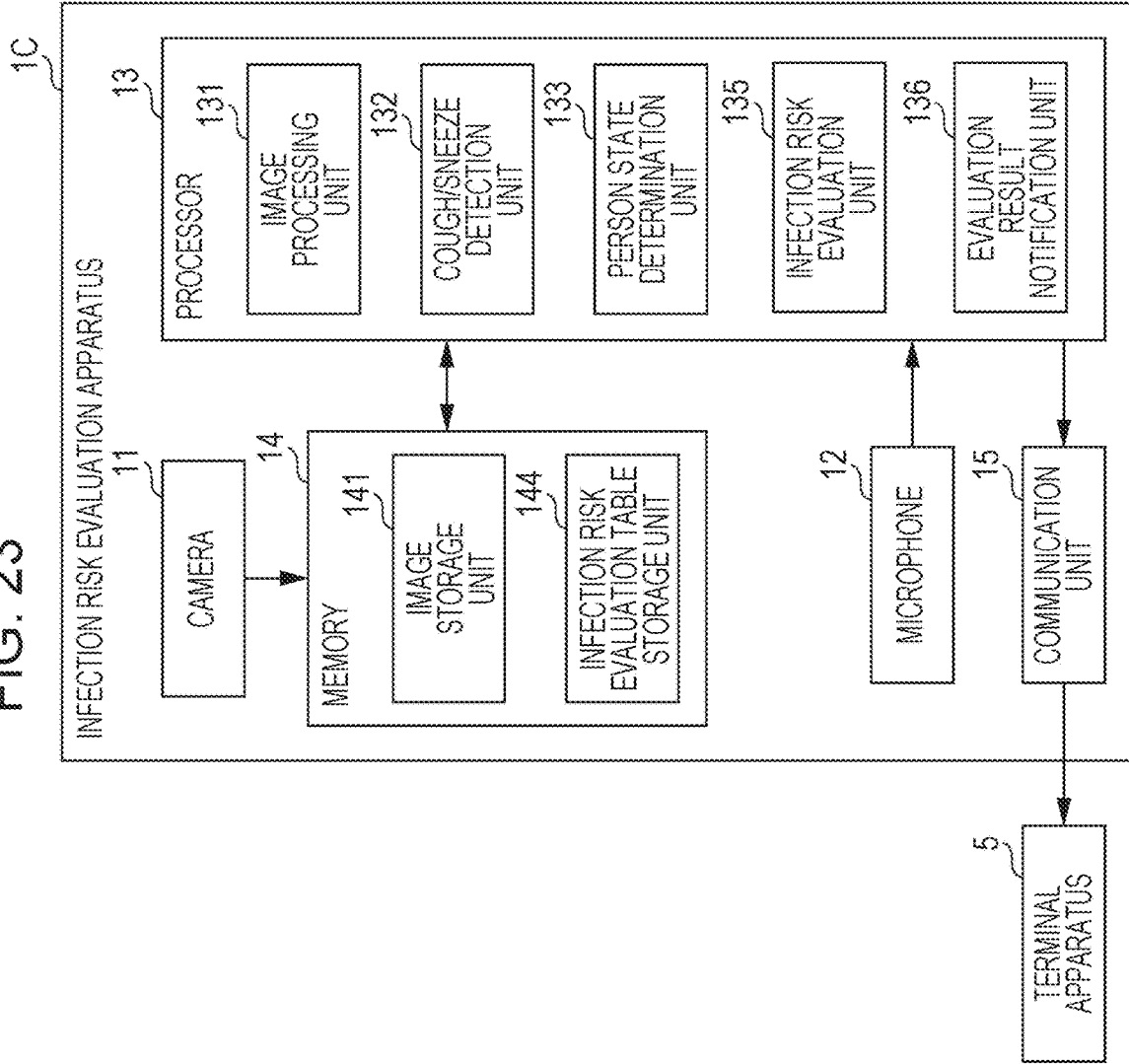
FIG. 23 is a diagram illustrating the configuration of an infection risk evaluation system according to one embodiment of the present disclosure.

FIG. 23 is a diagram illustrating the configuration of the infection risk evaluation system according to one embodiment of the present disclosure. The infection risk evaluation system illustrated in FIG. 23 is an example of an information processing system and includes an infection risk evaluation apparatus 1C and a terminal apparatus 5.

The infection risk evaluation apparatus 1C is an example of an information processing apparatus and evaluates a risk of being infected with an infectious disease (infection risk). The infection risk evaluation apparatus 1C is placed on a wall or a ceiling in a predetermined space.

The infection risk evaluation apparatus 1C is connected to the terminal apparatus 5 via a network so as to be capable of communicating with each other.

The terminal apparatus 5 is, for example, a personal computer, a smartphone, or a tablet computer. The terminal apparatus 5 is used by, for example, a manager or a worker of a facility in which a target is present.

The infection risk evaluation apparatus 1C includes the camera 11, the microphone 12, the processor 13, the memory 14, and the communication unit 15. In the case of detecting a cough or a sneeze on the basis of an image without using a sound, the infection risk evaluation apparatus 1C may not include a microphone.

The infection risk evaluation apparatus 1C does not determine whether or not a target is infected with an infectious disease, and handles a target who has coughed or sneezed as an infected person.

The camera 11 and the microphone 12 may be provided inside or outside the infection risk evaluation apparatus 1C. In a case where the camera 11 and the microphone 12 are provided outside the infection risk evaluation apparatus 1C, the infection risk evaluation apparatus 1C is connected to the camera 11 and the microphone 12 so as to be capable of communicating with each other in a wired or wireless manner.

The processor 13 includes the image processing unit 131, the cough/sneeze detection unit 132, the person state determination unit 133, an infection risk evaluation unit 135, and an evaluation result notification unit 136. The memory 14 is, for example, a semiconductor memory, and includes the image storage unit 141 and an infection risk evaluation table storage unit 144.

The infection risk evaluation apparatus 1C may include cameras. Accordingly, an image of a wide range can be captured without causing a single camera to sweep, and also camera calibration is more facilitated.

A person reflectively performs various motions when coughing or sneezing. For example, a person coughs or sneezes with a part of the face, such as the nose and mouth, covered with a hand, with the mouth covered with nothing, with a part of the face, such as the nose and mouth, covered with a handkerchief, with a part of the face, such as the nose and mouth, covered with a sleeve of a jacket, or with the mouth covered with a mask. It is considered that, depending on the state of a target when he/she coughs or sneezes, the risk of infection thereafter in the space varies. For example, when the target coughs or sneezes with the mouth covered with nothing, droplets or droplet nuclei fly several meters in front of the target. That is, when the target coughs or sneezes with the mouth covered with nothing, the risk of droplet infection or airborne infection in the space thereafter is very high. In addition, droplets or droplet nuclei may adhere to or accumulate on furniture therearound after flying into the space, and thus the risk of contact infection is not low.

When the target coughs or sneezes with the nose and mouth covered with a hand, virus particles mainly adhere to the hand. If the target touches a person or thing around him/her with the hand to which virus particles adhere, the person touched by the target or a person who touches the thing may become infected with the virus. Thus, when the target coughs or sneezes with the mouth covered with a hand, the risk of contact infection is high. The initial velocity of a cough or a sneeze is typically 10 m/s or more, that is, virus particles fly at high velocity. Thus, even when the mouth is covered with a hand, if there is a gap between fingers, droplets or droplet nuclei leak through the fingers. Thus, when the target coughs or sneezes with the mouth covered with a hand, the risk of airborne infection and droplet infection is not low.

When the target coughs or sneezes with the mouth covered with a handkerchief or a sleeve of a jacket, the probability that virus particles adhere to a hand is considerably lower than when the mouth is covered with a hand, and also a gap is less likely to be made. Thus, when the mouth is covered with a handkerchief or a sleeve of a jacket, the risk of infection is lower than when the mouth is covered with a hand. However, when the mouth is covered with a sleeve of a jacket, virus particles adhered to the sleeve may fly again over time as a result of a motion of the target. Thus, when the mouth is covered with a sleeve of a jacket, the risk of airborne infection is higher than when the mouth is covered with a handkerchief.

When the target coughs or sneezes with the mouth covered with a mask, most droplets or droplet nuclei are collected to the filter of the mask if the mask is properly worn. Thus, the risk of infection is low when the mouth is covered with a mask.

A person may cough or sneeze with the face oriented downward. When a person coughs or sneezes with the face oriented downward, droplets or droplet nuclei spread toward a lower part of the space, and thus the risk of droplet infection generally decreases.

As described above, the risk of being infected with an infectious disease varies according to the state around the mouth of a person when the person coughs or sneezes. In addition, the infection route with a high risk of infection varies according to the state around the mouth of the person.

The person state determination unit 133 recognizes the state around the mouth of the target from an image corresponding to a time before or after the time point when the cough or the sneeze is detected. The state around the mouth of a person can be classified into one of patterns. For example, the state around the mouth of a person includes a state in which the mouth of the person is not covered, a state in which the mouth of the person is covered with a hand, a state in which the mouth of the person is covered with a handkerchief, a state in which the mouth of the person is covered with clothes (for example, a sleeve of a jacket), and a state in which the mouth of the person is covered with a mask.

The person state determination unit 133 recognizes any one of a state in which the mouth of the person is not covered, a state in which the mouth of the person is covered with a hand, a state in which the mouth of the person is covered with a handkerchief, a state in which the mouth of the person is covered with clothes (for example, a sleeve of a jacket), and a state in which the mouth of the person is covered with a mask.

The infection risk evaluation table storage unit 144 stores an infection risk evaluation table in which the states around the mouth of a person are associated with evaluation values indicating the risks of being infected with an infectious diseases by droplet infection, contact infection, and airborne infection.

FIG. 24 is a diagram illustrating an example of the infection risk evaluation table stored in the infection risk evaluation table storage unit 144.

As illustrated in FIG. 24, a state in which the mouth is not covered is associated with an evaluation value "3" indicating the risk of being infected with an infectious disease by droplet infection, is associated with an evaluation value "2" indicating the risk of being infected with an infectious disease by contact infection, and is associated with an evaluation value "3" indicating the risk of being infected with an infectious disease by airborne infection. The evaluation value is expressed by a numerical value "1", "2", or "3", and a larger value represents a higher risk.

A state in which the mouth is covered with a hand is associated with an evaluation value "2" indicating the risk of being infected with an infectious disease by droplet infection, is associated with an evaluation value "3" indicating the risk of being infected with an infectious disease by contact infection, and is associated with an evaluation value "2" indicating the risk of being infected with an infectious disease by airborne infection.

A state in which the mouth is covered with a handkerchief is associated with an evaluation value "1" indicating the risk of being infected with an infectious disease by droplet infection, is associated with an evaluation value "1" indicating the risk of being infected with an infectious disease by contact infection, and is associated with an evaluation value "1" indicating the risk of being infected with an infectious disease by airborne infection.

A state in which the mouth is covered with a sleeve of a jacket is associated with an evaluation value "1" indicating the risk of being infected with an infectious disease by droplet infection, is associated with an evaluation value "1" indicating the risk of being infected with an infectious disease by contact infection, and is associated with an evaluation value "2" indicating the risk of being infected with an infectious disease by airborne infection.

A state in which the mouth is covered with a mask is associated with an evaluation value "1" indicating the risk of being infected with an infectious disease by droplet infection, is associated with an evaluation value "1" indicating the risk of being infected with an infectious disease by contact infection, and is associated with an evaluation value "1" indicating the risk of being infected with an infectious disease by airborne infection.

The infection risk evaluation unit 135 evaluates the risk of being infected with an infectious disease in a predetermined space on the basis of the state around the mouth of a person recognized by the person state determination unit 133. The infection risk evaluation unit 135 evaluates the risks of being infected with an infectious disease by droplet infection, contact infection, and airborne infection. The infection risk evaluation unit 135 extracts, from the infection risk evaluation table, the evaluation values of droplet infection, contact infection, and airborne infection associated with the state around the mouth of the person recognized by the person state determination unit 133, and accumulates the extracted evaluation values within a predetermined time period.

The evaluation result notification unit 136 outputs an evaluation result of the infection risk evaluation unit 135 to the communicating unit 15. In a case where a cumulative value is larger than or equal to a threshold value, the evaluation result notification unit 136 outputs to the communication unit 15 an evaluation result indicating that the risk of being infected with an infectious disease in the predetermined space is high.

The communication unit 15 transmits to the terminal apparatus 5 the evaluation result indicating that the risk of being infected with an infectious disease in the predetermined space is high.

The terminal apparatus 5 receives the evaluation result transmitted by the communication unit 15. The terminal apparatus 5 displays the received evaluation result.

Next, the operation of the infection risk evaluation apparatus 1C according to the present embodiment will be described.

Figure 25:
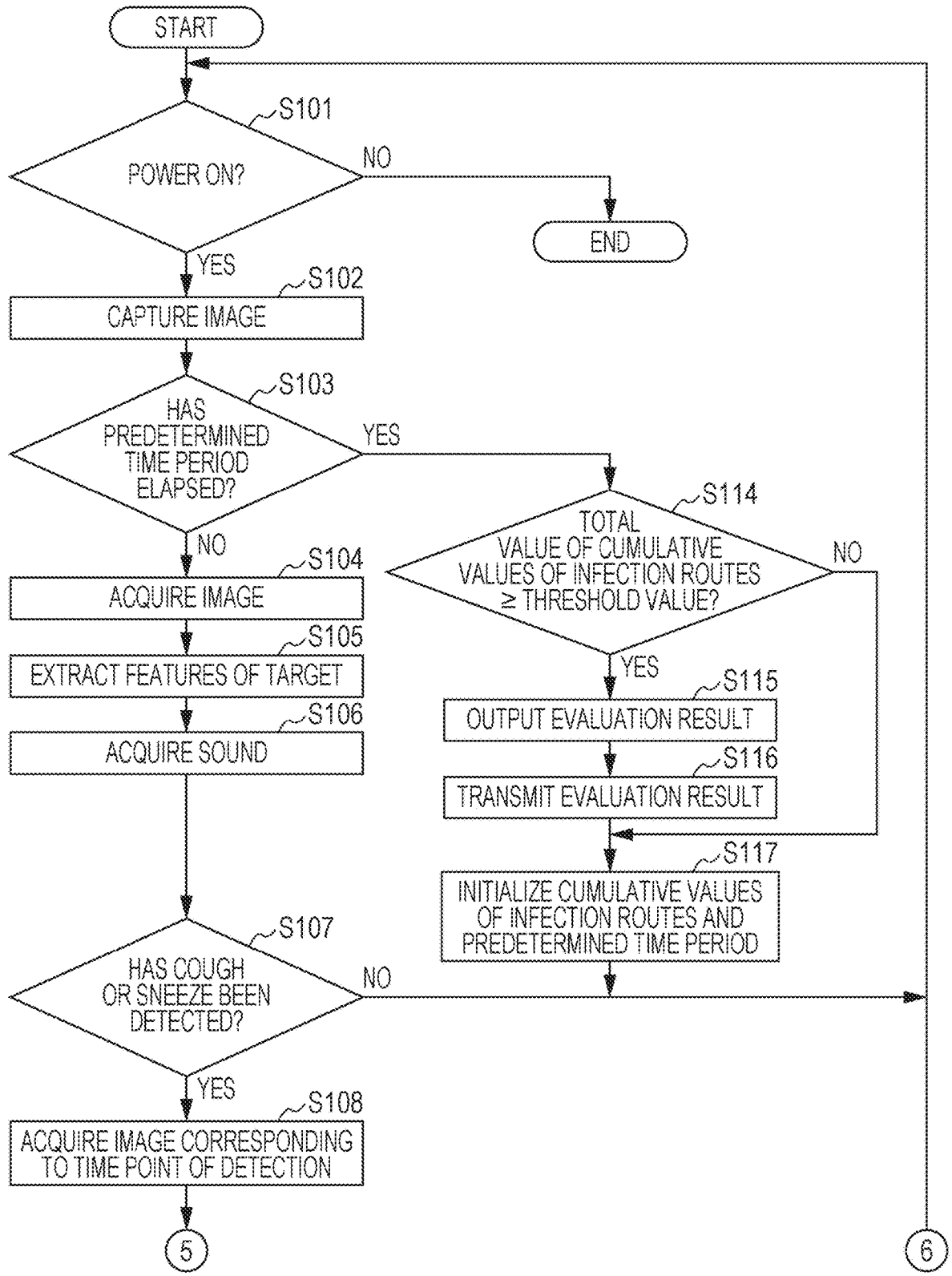
FIG. 25 is a first flowchart for describing the operation of an infection risk evaluation apparatus according to the one embodiment of the present disclosure.

FIG. 25 is a first flowchart for describing the operation of the infection risk evaluation apparatus 1C, and FIG. 26 is a second flowchart for describing the operation of the infection risk evaluation apparatus 1C.

First, in step S101, the processor 13 determines whether or not the infection risk evaluation apparatus 1C is in a power-ON state. If it is determined that the infection risk evaluation apparatus 1C is in a power-OFF state (NO in step S101), the process ends.

On the other hand, if it is determined that the infection risk evaluation apparatus 1C is in a power-ON state (YES in step S101), the process proceeds to step S102, where the camera 11 captures an image of a predetermined space. The camera 11 stores the captured image in the image storage unit 141. Specifically, the camera 11 stores a moving image in the image storage unit 141.

Subsequently, in step S103, the processor 13 determines whether or not a predetermined time period has elapsed. The predetermined time period is, for example, 30 minutes. In the present embodiment, it is determined at a predetermined time interval whether or not to make a notification of an evaluation result of the risk of being infected with an infectious disease. If a notification of an evaluation result is frequently made, for example, at an interval of 1 minute, the notified person may feel it troublesome. Thus, it is preferable to make a notification at an interval of, for example, 30 minutes. Accordingly, the risk of being infected with an infectious disease in the predetermined space in the predetermined time period can be evaluated. The predetermined time period may be settable by a manager or the like.

If it is determined that the predetermined time period has not elapsed (NO in step S103), the process proceeds to step S104, where the image processing unit 131 acquires an image from the image storage unit 141.

Subsequently, in step S105, the image processing unit 131 extracts features of a target from the image. Here, the features of the target include, for example, the face, the eyes, the mouth, the right hand, the left hand, the clothes, and the mask of the target. In addition, the image processing unit 131 detects the center-of-gravity positions of the individual features.

Subsequently, in step S106, the cough/sneeze detection unit 132 acquires a sound from the microphone 12.

Subsequently, in step S107, the cough/sneeze detection unit 132 determines whether or not a cough or a sneeze of the target who is in the predetermined space has been detected. Here, the cough/sneeze detection unit 132 calculates a first distance between the center-of-gravity position of the face and the center-of-gravity position of the right hand extracted from the image, and also calculates a second distance between the center-of-gravity position of the face and the center-of-gravity position of the left hand extracted from the image. The cough/sneeze detection unit 132 determines whether or not the shorter one of the first distance and the second distance is smaller than or equal to a threshold value. If the cough/sneeze detection unit 132 determines that the shorter one of the first distance and the second distance is smaller than or equal to the threshold value, the cough/sneeze detection unit 132 determines whether or not the volume of the sound acquired from the microphone 12 is larger than or equal to a threshold value. If the cough/sneeze detection unit 132 determines that the shorter one of the first distance and the second distance is smaller than or equal to the threshold value and that the volume of the sound is larger than or equal to the threshold value, the cough/sneeze detection unit 132 determines that a cough or a sneeze of the target who is in the predetermined space has been detected. If the cough/sneeze detection unit 132 determines that the shorter one of the first distance and the second distance is larger than the threshold value or that the volume of the sound is smaller than the threshold value, the cough/sneeze detection unit 132 determines that a cough of the target who is in the predetermined space has not been detected and that a sneeze of the target who is in the predetermined space has not been detected.

If it is determined that a cough or a sneeze of the target who is in the predetermined space has not been detected (NO in step S107), the process returns to step S101.

On the other hand, if it is determined that a cough or a sneeze of the target who is in the predetermined space has been detected (YES in step S107), the process proceeds to step S108, where the person state determination unit 133 acquires, from the image storage unit 141, an image corresponding to the time point when the cough or the sneeze of the target who is in the predetermined space is detected.

Subsequently, in step S109, the person state determination unit 133 recognizes the state around the mouth of the target when the target coughed or sneezed. Here, the person state determination unit 133 recognizes, from the image corresponding to the time point when the cough or the sneeze of the target who is in the predetermined space is detected, whether the state around the mouth of the target is any one of a state in which the mouth of the person is not covered, a state in which the mouth of the person is covered with a hand, a state in which the mouth of the person is covered with a handkerchief, a state in which the mouth of the person is covered with a sleeve of a jacket, and a state in which the mouth of the person is covered with a mask.

The person state determination unit 133 may recognize the state around the mouth of the target from an image corresponding to a time before or after the time point when the cough or the sneeze is detected, in addition to the image corresponding to the time point when the cough or the sneeze is detected.

Subsequently, in step S110, the infection risk evaluation unit 135 acquires cumulative values of evaluation values stored in the memory 14. The memory 14 stores cumulative values of the evaluation values of the risks of droplet infection, contact infection, and airborne infection in the predetermined space. The infection risk evaluation unit 135 acquires from the memory 14 the cumulative values of the evaluation values of the risks of droplet infection, contact infection, and airborne infection in the predetermined space.

Subsequently, in step S111, the infection risk evaluation unit 135 reads out the infection risk evaluation table from the infection risk evaluation table storage unit 144.

Subsequently, in step S112, the infection risk evaluation unit 135 refers to the infection risk evaluation table to determine the evaluation values of the risks of droplet infection, contact infection, and airborne infection corresponding to the state around the mouth of the target recognized by the person state determination unit 133.

Subsequently, in step S113, the infection risk evaluation unit 135 adds the determined evaluation values of the risks of droplet infection, contact infection, and airborne infection to the acquired cumulative values, and stores in the memory 14 the cumulative values of the evaluation values of the risks of droplet infection, contact infection, and airborne infection. Accordingly, the cumulative values in the memory 14 are updated. After that, the process returns to step S101, and step S101 and the following steps are performed.

On the other hand, if it is determined in step S103 that the predetermined time period has elapsed (YES in step S103), the process proceeds to step S114, where the infection risk evaluation unit 135 determines whether or not a total value of the cumulative values of the individual infection routes is larger than or equal to a threshold value. Specifically, the infection risk evaluation unit 135 adds up the cumulative values of the evaluation values of the risks of droplet infection, contact infection, and airborne infection stored in the memory 14, and determines whether or not the total value is larger than or equal to the threshold value. If it is determined that the total value of the cumulative values is smaller than the threshold value (NO in step S114), the process proceeds to step S117.

On the other hand, if it is determined that the total value of the cumulative values is larger than or equal to the threshold value (YES in step S114), the process proceeds to step S115, where the evaluation result notification unit 136 outputs to the communication unit 15 an evaluation result indicating that the risk of being infected with an infectious disease in the predetermined space is high.

Subsequently, in step S116, the communication unit 15 transmits to the terminal apparatus 5 the evaluation result indicating that the risk of being infected with an infectious disease in the predetermined space is high. The terminal apparatus 5 receives the evaluation result transmitted by the infection risk evaluation apparatus 1C and displays the received evaluation result. A manager checks the evaluation result displayed on the terminal apparatus 5 and, because the risk of being infected with an infectious disease in the predetermined space is high, ventilates the predetermined space, turns on the power of an air purifier placed in the predetermined space, or causes a person who is in the predetermined pace to move to another place.

Subsequently, in step S117, the infection risk evaluation unit 135 initializes the cumulative values of the evaluation values of the individual infection routes and the predetermined time period stored in the memory 14. After that, the process returns to step S101, and step S101 and the following steps are performed.

In step S114, the infection risk evaluation unit 135 determines whether or not the total value of the cumulative values of the individual infection routes is larger than or equal to the threshold value. The present disclosure is not particularly limited thereto, and the infection risk evaluation unit 135 may determine whether or not at least one of the cumulative values of the individual infection routes is larger than or equal to a threshold value. Specifically, the infection risk evaluation unit 135 may determine whether or not at least one of the cumulative value of the evaluation values of the risk of droplet infection, the cumulative value of the evaluation values of the risk of contact infection, or the cumulative value of the evaluation values of the risk of airborne infection is larger than or equal to the threshold value.

The evaluation result notification unit 136 outputs to the communication unit 15 the evaluation result indicating that the risk of being infected with an infectious disease in the predetermined space is high. The present disclosure is not particularly limited thereto, and the evaluation result notification unit 136 may output to the communication unit 15 the individual cumulative values of droplet infection, contact infection, and airborne infection as an evaluation result. In this case, if it is determined that the total value of the cumulative values is larger than or equal to the threshold value, the evaluation result notification unit 136 may output to the communication unit 15 the individual cumulative values of droplet infection, contact infection, and airborne infection as an evaluation result. In addition, when the predetermined time period has elapsed, the evaluation result notification unit 136 may output to the communication unit 15 the individual cumulative values of droplet infection, contact infection, and airborne infection as an evaluation result without determining whether or not the total value of the cumulative values is larger than or equal to the threshold value.

In the present disclosure, an evaluation result is transmitted to the terminal apparatus 5 when the predetermined time period has elapsed and it is determined that the total value of the cumulative values is larger than or equal to the threshold value, but the present disclosure is not particularly limited thereto. Every time the cumulative values of droplet infection, contact infection, and airborne infection are stored in step S113, the cumulative values of droplet infection, contact infection, and airborne infection may be transmitted to the terminal apparatus 5. In this case, the terminal apparatus 5 is capable of displaying the cumulative values of droplet infection, contact infection, and airborne infection in real time.

The number of targets who are in the predetermined space is not limited to one, but targets may be present therein. When there are targets in the predetermined space, coughs or sneezes of the individual targets may be detected, the states around the mouths of the individual targets may be recognized, evaluation values of the risks of droplet infection, contact infection, and airborne infection corresponding to the recognized states around the mouths of the individual targets may be determined, and cumulative values of the evaluation values of the risks of droplet infection, contact infection, and airborne infection may be stored.

The memory 14 may store in advance infected person information in which a face image of a target is associated with information indicating whether or not the target is infected with an infectious disease. In this case, the infection risk evaluation unit 135 may determine, using the face image of the target included in image information, whether or not the target is infected with an infectious disease. If the infection risk evaluation unit 135 determines that the target is infected with an infectious disease, the infection risk evaluation unit 135 may weigh an evaluation value that has been determined. If the infection risk evaluation unit 135 determines that the target is not infected with an infectious disease, the infection risk evaluation unit 135 may determine the evaluation value to be 0. The infection risk evaluation apparatus 1C may capture a face image of a target in advance, may acquire biological information of the target from a biological sensor, and may determine, using the acquired biological information, whether or not the target is infected with an infectious disease. In addition, the infection risk evaluation apparatus 1C may receive, from a doctor or a manager, input of information indicating whether or not the target is infected with an infectious disease.

The above-described infection risk evaluation system is an example of the following information processing system.

An information processing system including:
a camera that captures an image of a predetermined space; and
an information processing apparatus, wherein
the information processing apparatus
detects a cough or a sneeze of a person who is in the predetermined space,
acquires an image of the predetermined space captured by the camera when the cough or the sneeze is detected,
recognizes a state around a mouth of the person from the image,
evaluates, based on the state around the mouth, a risk of being infected with an infectious disease in the predetermined space, and
outputs an evaluation result.

With the above information processing system, the following information processing method can be implemented.

An information processing method including:
detecting a cough or a sneeze of a person who is in a predetermined space;
acquiring an image of the predetermined space captured when the cough or the sneeze is detected;
recognizing a state around a mouth of the person from the image;
evaluating, based on the state around the mouth, a risk of being infected with an infectious disease in the predetermined space; and
outputting an evaluation result.

In the configuration of the information processing method, the state around the mouth of the person is recognized from the image of the predetermined space captured when the cough or the sneeze is detected, and the risk of being infected with an infectious disease in the predetermined space is evaluated based on the state around the mouth of the person. Thus, it is possible to estimate the risk of being infected with an infectious disease in the predetermined space in which the cough or the sneeze has been detected. In addition, when it is estimated that the risk of being infected with an infectious disease in the predetermined space is high, appropriate measures can be promoted to reduce the risk of being infected with the infectious disease.

In the above information processing method, the recognizing the state around the mouth of the person may include recognizing any one of a state in which the mouth of the person is not covered and a state in which the mouth of the person is covered with a hand.

In this configuration, the risk of being infected with an infectious disease is different between a state in which the mouth of the person is not covered and a state in which the mouth of the person is covered with a hand. Thus, based on whether the state around the mouth of the person is any one of a state in which the mouth of the person is not covered and a state in which the mouth of the person is covered with a hand, it is possible to more accurately evaluate the risk of being infected with an infectious disease in the predetermined space.

In the above information processing method, the recognizing the state around the mouth of the person may include recognizing any one of a state in which the mouth of the person is not covered, a state in which the mouth of the person is covered with a hand, and a state in which the mouth of the person is covered with a mask.

In this configuration, the risk of being infected with an infectious disease is different among a state in which the mouth of the person is not covered, a state in which the mouth of the person is covered with a hand, and a state in which the mouth of the person is covered with a mask. Thus, based on whether the state around the mouth of the person is any one of a state in which the mouth of the person is not covered, a state in which the mouth of the person is covered with a hand, and a state in which the mouth of the person is covered with a mask, it is possible to more accurately evaluate the risk of being infected with an infectious disease in the predetermined space.

In the above information processing method, the recognizing the state around the mouth of the person may include recognizing any one of a state in which the mouth of the person is not covered, a state in which the mouth of the person is covered with a hand, a state in which the mouth of the person is covered with a handkerchief, and a state in which the mouth of the person is covered with a mask.

In this configuration, the risk of being infected with an infectious disease is different among a state in which the mouth of the person is not covered, a state in which the mouth of the person is covered with a hand, a state in which the mouth of the person is covered with a handkerchief, and a state in which the mouth of the person is covered with a mask. Thus, based on whether the state around the mouth of the person is any one of a state in which the mouth of the person is not covered, a state in which the mouth of the person is covered with a hand, a state in which the mouth of the person is covered with a handkerchief, and a state in which the mouth of the person is covered with a mask, it is possible to more accurately evaluate the risk of being infected with an infectious disease in the predetermined space.

In the above information processing method, the recognizing the state around the mouth of the person may include recognizing any one of a state in which the mouth of the person is not covered, a state in which the mouth of the person is covered with a hand, a state in which the mouth of the person is covered with a handkerchief, a state in which the mouth of the person is covered with clothes, and a state in which the mouth of the person is covered with a mask.

In this configuration, the risk of being infected with an infectious disease is different among a state in which the mouth of the person is not covered, a state in which the mouth of the person is covered with a hand, a state in which the mouth of the person is covered with a handkerchief, a state in which the mouth of the person is covered with clothes, and a state in which the mouth of the person is covered with a mask. Thus, based on whether the state around the mouth of the person is any one of a state in which the mouth of the person is not covered, a state in which the mouth of the person is covered with a hand, a state in which the mouth of the person is covered with a handkerchief, a state in which the mouth of the person is covered with clothes, and a state in which the mouth of the person is covered with a mask, it is possible to more accurately evaluate the risk of being infected with an infectious disease in the predetermined space.

In the above information processing method, the detecting the cough or the sneeze may include detecting the cough or the sneeze of the person who is in the predetermined space from the image.

In this configuration, the cough or the sneeze of the person who is in the predetermined space can be detected by using the image.

In the above information processing method, the detecting the cough or the sneeze may include determining whether or not a distance between a position of a face of the person included in the image and a position of one hand of the person included in the image is smaller than or equal to a threshold value and detecting the cough or the sneeze if a determination is made that the distance is smaller than or equal to the threshold value.

Typically, a person covers the mouth with a hand when coughing or sneezing. Thus, as a result of determining whether or not the distance between the position of the face of the person included in the image and the position of one hand of the person included in the image is smaller than or equal to the threshold value, it can be easily detected that the person has coughed or sneezed.

In the above information processing method, the detecting the cough or the sneeze may include determining whether or not an area of the mouth of the person included in the image is smaller than or equal to a threshold value and detecting the cough or the sneeze if a determination is made that the area is smaller than or equal to the threshold value.

Typically, a person covers the mouth with a hand when coughing or sneezing. Thus, as a result of determining whether or not the area of the mouth of the person included in the image is smaller than or equal to the threshold value, it can be easily detected that the person has coughed or sneezed.

The above information processing method may further include acquiring, from a microphone installed in the predetermined space, a sound collected in the predetermined space, and the detecting the cough or the sneeze may include detecting the cough or the sneeze of the person who is in the predetermined space from the image and the sound.

In this configuration, the sound collected in the predetermined space can be acquired from the microphone installed in the predetermined space. In the detection of the cough or the sneeze, the cough or the sneeze of the person who is in the predetermined space is detected from the image and the sound.

Accordingly, the cough or the sneeze of the person who is in the predetermined space is detected by using not only the image but also the sound, and thus the cough or the sneeze of the person who is in the predetermined space can be more accurately detected.

In the above information processing method, the evaluating the risk of being infected with the infectious disease may include evaluating risks of being infected with the infectious disease by droplet infection, contact infection, and airborne infection.

In this configuration, the risks of being infected with the infectious disease by droplet infection, contact infection, and airborne infection are evaluated, and thus the risks of being infected with the infectious disease can be estimated for the individual infection routes, droplet infection, contact infection, and airborne infection. In addition, measures against infection can be taken in accordance with the individual infection routes, droplet infection, contact infection, and airborne infection.

In the above information processing method, the evaluating the risk of being infected with the infectious disease may include extracting, from an evaluation table in which states around the mouth of the person are associated with evaluation values indicating the risks of being infected with the infectious disease by droplet infection, contact infection, and airborne infection, the evaluation values of droplet infection, contact infection, and airborne infection associated with the recognized state around the mouth of the person, and accumulating the extracted evaluation values, and the outputting the evaluation result may include outputting cumulative values of droplet infection, contact infection, and airborne infection as the evaluation result.

In this configuration, in the evaluation table, the states around the mouth of the person are associated with the evaluation values indicating the risks of being infected with an infectious disease by droplet infection, contact infection, and airborne infection. The evaluation values of droplet infection, contact infection, and airborne infection associated with the recognized state around the mouth of the person are extracted from the evaluation table. The extracted evaluation values are accumulated. The cumulative values of droplet infection, contact infection, and airborne infection are output as the evaluation result.

Thus, with use of the cumulative values of droplet infection, contact infection, and airborne infection, the risks of being infected with an infectious disease by droplet infection, contact infection, and airborne infection can be easily estimated.

In the above information processing method, the evaluating the risk of being infected with the infectious disease may include extracting, from an evaluation table in which states around the mouth of the person are associated with evaluation values indicating the risks of being infected with the infectious disease by droplet infection, contact infection, and airborne infection, the evaluation values of droplet infection, contact infection, and airborne infection associated with the recognized state around the mouth of the person, and accumulating the extracted evaluation values within a predetermined time period, and the outputting the evaluation result may include outputting, if a cumulative value is larger than or equal to a threshold value, the evaluation result indicating that the risk of being infected with the infectious disease in the predetermined space is high.

In this configuration, in the evaluation table, the states around the mouth of the person are associated with the evaluation values indicating the risks of being infected with an infectious disease by droplet infection, contact infection, and airborne infection. The evaluation values of droplet infection, contact infection, and airborne infection associated with the recognized state around the mouth of the person are extracted from the evaluation table. The extracted evaluation values are accumulated within the predetermined time period. If the cumulative value is larger than or equal to the threshold value, the evaluation result indicating that the risk of being infected with the infectious disease in the predetermined space is high is output.

Thus, with use of the cumulative values of droplet infection, contact infection, and airborne infection within the predetermined time period, the risks of being infected with an infectious disease by droplet infection, contact infection, and airborne infection can be easily estimated.

The apparatuses according to the embodiments of the present disclosure have been described above. The present disclosure is not limited to these embodiments. An embodiment established by applying various changes conceived of by a person skilled in the art to any one of the embodiments, or an embodiment established by combining components in different embodiments may be included in the scope of one or more aspects of the present disclosure without deviating from the gist of the present disclosure.

In each of the above embodiments, the individual components may be configured by dedicated hardware or may be implemented by executing a software program suitable for the individual components. The individual components may be implemented by reading and executing, by a program execution unit of a CPU, a processor, or the like, a software program recorded on a recording medium, such as a hard disk or a semiconductor memory.

Some or all of the functions of the apparatuses according to the embodiments of the present disclosure are typically implemented as a large scale integration (LSI) circuit, which is an integrated circuit. These functions may be formed of individual chips or may be formed of a single chip so as to include some or all of the functions. The method for circuit integration is not limited to LSI, and circuit integration may be performed by using a dedicated circuit or a general-purpose processor. A field programmable gate array (FPGA) capable of being programmed after LSI manufacturing, or a reconfigurable processor in which the connections and settings of a circuit cell in LSI are reconfigurable, may be used.

Some or all of the functions of the apparatuses according to the embodiments of the present disclosure may be implemented by executing a program by a processor, such as a CPU.

The numerals used above are merely examples for specifically describing the present disclosure, and the present disclosure is not limited to these numerals.

The order in which the steps of the individual flowcharts are performed is merely an example for specifically describing the present disclosure, and the order may be changed within a range in which similar effects can be obtained. Some of the above steps may be executed at the same time as another step (in parallel).

Furthermore, various modification examples implemented by applying changes conceived of by a person skilled in the art to the embodiments of the present disclosure are included in the present disclosure without deviating from the gist of the present disclosure.

An information processing method, a recording medium, and an information processing system according to one embodiment of the present disclosure are capable of reducing the risk of being infected with an infectious disease in a predetermined space where a cough or a sneeze has been detected, and are useful as an information processing method, a recording medium, and an information processing system that control an airflow in the predetermined space where a cough or a sneeze has been detected.

What is claimed is:

1. An information processing method comprising:
acquiring an image of a person in a predetermined space;
recognizing a state in which a mouth of the person is covered with a hand from the image;
determining, based on the state around the mouth, a first value indicating risk of a receptor being infected with an infectious disease in the predetermined space by airborne infection;
outputting an evaluation result based on the first value,
wherein the person and the receptor are included in the predetermined space; and the information processing method further comprises:
determining, based on the state around the mouth, a second value indicating risk of the receptor being infected with the infectious disease in the predetermined space by contact infection; and
determining, based on the state around the mouth, a third value indicating risk of the receptor being infected with the infectious disease in the predetermined space by droplet infection, and
wherein the evaluation result is based on the second value and the third value.

2. An information processing system comprising:
a camera that captures an image including a person in a predetermined space; and
an information processing apparatus, wherein
the information processing apparatus
acquires the image,
recognizes a state in which a mouth of the person is covered with a hand from the image,
determines, based on the state around the mouth, a first value indicating risk of a receptor being infected with an infectious disease in the predetermined space by airborne infection, and
outputs an evaluation result based on the first value, and
wherein the person and the receptor are included in the predetermined space; and
the information processing apparatus further
determines, based on the state around the mouth, a second value indicating risk of the receptor being infected with the infectious disease in the predetermined space by contact infection,
determines, based on the state around the mouth, a third value indicating risk of the receptor being infected with the infectious disease in the predetermined space by droplet infection, and
wherein the evaluation result is based on the second value and the third value.

* * * * *